United States Patent
Lee et al.

(10) Patent No.: US 12,333,696 B2
(45) Date of Patent: Jun. 17, 2025

(54) ELECTRONIC DEVICE FOR DETECTING DEFECT IN IMAGE ON BASIS OF DIFFERENCE AMONG SUB-IMAGES ACQUIRED BY MULTIPLE PHOTODIODE SENSORS, AND OPERATION METHOD THEREOF

(71) Applicant: Samsung Electronics Co., Ltd., Suwon-si (KR)

(72) Inventors: Jeongwon Lee, Suwon-si (KR); Eunho Kim, Suwon-si (KR); Changgon Kim, Suwon-si (KR); Jaecheol Bae, Suwon-si (KR); Hongseok Yang, Suwon-si (KR); Sanghwan Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/963,664

(22) Filed: Oct. 11, 2022

(65) Prior Publication Data
US 2023/0042544 A1    Feb. 9, 2023

Related U.S. Application Data

(63) Continuation of application No. PCT/KR2021/004608, filed on Apr. 13, 2021.

(30) Foreign Application Priority Data

Apr. 17, 2020    (KR) .................. 10-2020-0046911

(51) Int. Cl.
*G06T 7/00* (2017.01)
*G06V 10/141* (2022.01)
(Continued)

(52) U.S. Cl.
CPC .......... *G06T 7/0002* (2013.01); *G06V 10/141* (2022.01); *G06V 10/60* (2022.01);
(Continued)

(58) Field of Classification Search
CPC ......... G06T 7/0002; G06T 2207/10144; G06T 5/00; G06T 5/50; G06T 7/001;
(Continued)

(56) References Cited

U.S. PATENT DOCUMENTS

| 8,208,043 B2 | 6/2012 | Deng et al. |
| 8,665,347 B2 * | 3/2014 | Miyawaki ............. G06T 7/0002 348/234 |

(Continued)

FOREIGN PATENT DOCUMENTS

| JP | 2016-225932 A | 12/2016 |
| JP | 2018-013794 A | 1/2018 |

(Continued)

OTHER PUBLICATIONS

Extended European Search Report dated May 17, 2023, issued in a European Patent Application No. 21788871.8.

*Primary Examiner* — Matthew C Bella
*Assistant Examiner* — Nicholas John Helco
(74) *Attorney, Agent, or Firm* — Jefferson IP Law, LLP

(57) ABSTRACT

An electronic device is provided. The electronic device includes a memory, an image sensor including light receiving elements each including at least two sub light receiving elements, and an image signal processor. The image signal processor is configured to obtain images corresponding to light from outside by using the image sensor, the images including at least a raw image, a first sub image, and a second sub image, the first sub image being an image corresponding to light detected by at least one first sub light, the second sub image being an image corresponding to light
(Continued)

detected by at least one second sub light, identify a luminance ratio between the first sub image and the second sub image, identify a defect in the raw image, based on the luminance ratio, and perform a function corresponding to a type of the defect.

19 Claims, 37 Drawing Sheets

(51) Int. Cl.
    *G06V 10/60*     (2022.01)
    *G06V 10/74*     (2022.01)
    *G06V 10/75*     (2022.01)
    *G06V 10/98*     (2022.01)

(52) U.S. Cl.
    CPC .......... *G06V 10/751* (2022.01); *G06V 10/761* (2022.01); *G06V 10/98* (2022.01); *G06T 2207/10144* (2013.01)

(58) Field of Classification Search
    CPC ........... G06T 7/40; G06T 7/41; G06V 10/141; G06V 10/60; G06V 10/751; G06V 10/761; G06V 10/98; G06V 10/22; G06V 10/30; G06V 10/74; G06V 10/75; G06V 10/7515; H04N 23/811; H04N 23/82; H04N 25/61; H04N 25/683; H04N 25/704; H04N 25/68
    See application file for complete search history.

(56) References Cited

U.S. PATENT DOCUMENTS

| | | | |
|---|---|---|---|
| 9,020,281 B2 | 4/2015 | Yamashita | |
| 9,042,658 B2 * | 5/2015 | Nakamura | ................ G06T 5/70 382/300 |
| 9,264,636 B2 * | 2/2016 | Sugawara | .............. H04N 23/76 |
| 9,497,427 B2 | 11/2016 | Stern et al. | |
| 9,813,593 B2 | 11/2017 | Akiyama et al. | |
| 9,979,909 B2 | 5/2018 | Kuang et al. | |
| 10,089,540 B2 | 10/2018 | May et al. | |
| 10,893,193 B2 | 1/2021 | Jinno | |
| 10,924,665 B2 | 2/2021 | Kanda et al. | |
| 2007/0092154 A1 | 4/2007 | Kato et al. | |
| 2007/0247638 A1 | 10/2007 | Owner-Petersen et al. | |
| 2009/0027521 A1 | 1/2009 | Fukumoto | |
| 2011/0115980 A1 * | 5/2011 | Shmueli | .................... G06T 5/92 348/E5.062 |
| 2013/0286253 A1 | 10/2013 | Moon et al. | |
| 2014/0146197 A1 * | 5/2014 | Okuzawa | ............. H04N 25/704 348/222.1 |
| 2014/0232869 A1 | 8/2014 | May et al. | |
| 2015/0177512 A1 | 6/2015 | Hayakawa et al. | |
| 2015/0215509 A1 | 7/2015 | Miesak | |
| 2015/0241350 A1 | 8/2015 | Miesak | |
| 2016/0004144 A1 * | 1/2016 | Laroia | ..................... G03B 17/02 348/222.1 |
| 2016/0286108 A1 * | 9/2016 | Fettig | ................... H04N 23/667 |
| 2017/0070689 A1 | 3/2017 | Silverstein et al. | |
| 2017/0109590 A1 | 4/2017 | Gehrke | |
| 2017/0140227 A1 | 5/2017 | Takemura et al. | |
| 2017/0180615 A1 | 6/2017 | Lautenbach | |
| 2017/0193641 A1 | 7/2017 | Cheng | |
| 2017/0236036 A1 | 8/2017 | Kawai et al. | |
| 2017/0257557 A1 * | 9/2017 | Trusten | ................... H04N 23/64 |
| 2018/0096474 A1 | 4/2018 | Guerreiro et al. | |
| 2018/0098001 A1 | 4/2018 | Park et al. | |
| 2018/0253850 A1 | 9/2018 | Kawai | |
| 2018/0270422 A1 | 9/2018 | Akkala et al. | |
| 2019/0075246 A1 * | 3/2019 | Kanda | ................... H04N 25/46 |
| 2021/0150742 A1 | 5/2021 | Sato et al. | |

FOREIGN PATENT DOCUMENTS

| | | |
|---|---|---|
| JP | 2018-106456 A | 7/2018 |
| JP | 2019-100937 A | 6/2019 |
| JP | 2019-152910 A | 9/2019 |
| JP | 2020-059565 A1 | 9/2021 |
| JP | 7003502 B2 | 1/2022 |
| KR | 10-1946946 B1 | 4/2019 |
| KR | 10-2157491 B1 | 9/2020 |
| WO | 2020-059565 A1 | 9/2021 |

* cited by examiner

ELECTRONIC DEVICE FOR DETECTING DEFECT IN IMAGE ON BASIS OF DIFFERENCE AMONG SUB-IMAGES ACQUIRED BY MULTIPLE PHOTODIODE SENSORS, AND OPERATION METHOD THEREOF

CROSS-REFERENCE TO RELATED APPLICATION(S)

This application is a continuation application, claiming priority under § 365(c), of an International application No. PCT/KR2021/004608, filed on Apr. 13, 2021, which is based on and claims the benefit of a Korean patent application number 10-2020-0046911, filed on Apr. 17, 2020, in the Korean Intellectual Property Office, the disclosure of which is incorporated by reference herein in its entirety.

BACKGROUND

1. Field

The disclosure relates to an electronic device for detecting a defect of an image based on a difference between sub images acquired by multiple photodiode sensors, and an operating method thereof.

2. Description of Related Art

With advancement of information technology (IT) technology, cameras have evolved from traditional film cameras to digital cameras. The digital camera may convert light into an electrical image signal and then store it as digital data (image data).

An electronic device, such as a smart phone may include a camera module in which the digital camera is miniaturized. The electronic device may acquire an image of a subject by use of the camera module.

The above information is presented as background information only to assist with an understanding of the disclosure. No determination has been made, and no assertion is made, as to whether any of the above might be applicable as prior art with regard to the disclosure.

SUMMARY

An image of a subject acquired using a camera module may have various defects. To reduce the defects of the image, a plurality of images may be used. In this case, resources may be consumed to acquire the plurality of the images.

Hence, what is needed is a technique for accurately detecting the defect of the image in real time and thus effectively correcting the defect.

Aspects of the disclosure are to address at least the above-mentioned problems and/or disadvantages and to provide at least the advantages described below. Accordingly, an aspect of the disclosure is to provide an electronic device for detecting a defect of an image based on a difference between sub images acquired by multiple photodiode sensors, and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory, an image sensor in which light receiving elements are arranged, the light receiving elements each including at least two sub light receiving elements, and an image signal processor operatively coupled with the memory, and the image sensor, and the image signal processor may be configured to obtain images corresponding to light from outside by using the image sensor, the images including at least a raw image, a first sub image, and a second sub image, the first sub image being an image corresponding to light detected by at least one first sub light receiving element positioned at a first position corresponding in the light receiving elements, the second sub image being an image corresponding to light detected by at least one second sub light receiving element positioned at a second position corresponding in the light receiving elements, the first position distinguished from the second position, identify a luminance ratio between the first sub image and the second sub image, identify a defect in the raw image, based on the luminance ratio, and perform a function corresponding to a type of the defect.

In accordance with another aspect of the disclosure, a method of operating an electronic device includes obtaining images corresponding to light from outside by using an image sensor of the electronic device, the images including at least a raw image, a first sub image, and a second sub image, the first sub image being an image corresponding to light detected by at least one first sub light receiving element positioned at a first position corresponding in the light receiving elements of the electronic device, the second sub image being an image corresponding to light detected by at least one second sub light receiving element positioned at a second position corresponding in the light receiving elements, the first position distinguished from the second position, identifying a luminance ratio between the first sub image and the second sub image, identifying a defect in the raw image, based on the luminance ratio, and performing a function corresponding to a type of the defect.

An apparatus and an operating method thereof according to various embodiments of the disclosure, may analyze sub images of an image in real time, and thus quickly and accurately detect a defect of the image.

An electronic device and an operating method thereof according to various embodiments of the disclosure, may effectively correct a defect of an image, by correcting the detected image defect based on a corresponding correction value.

Effects obtainable from the disclosure are not limited to the above-mentioned effects, and other effects which are not mentioned may be clearly understood by those skilled in the art of the disclosure through the following descriptions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
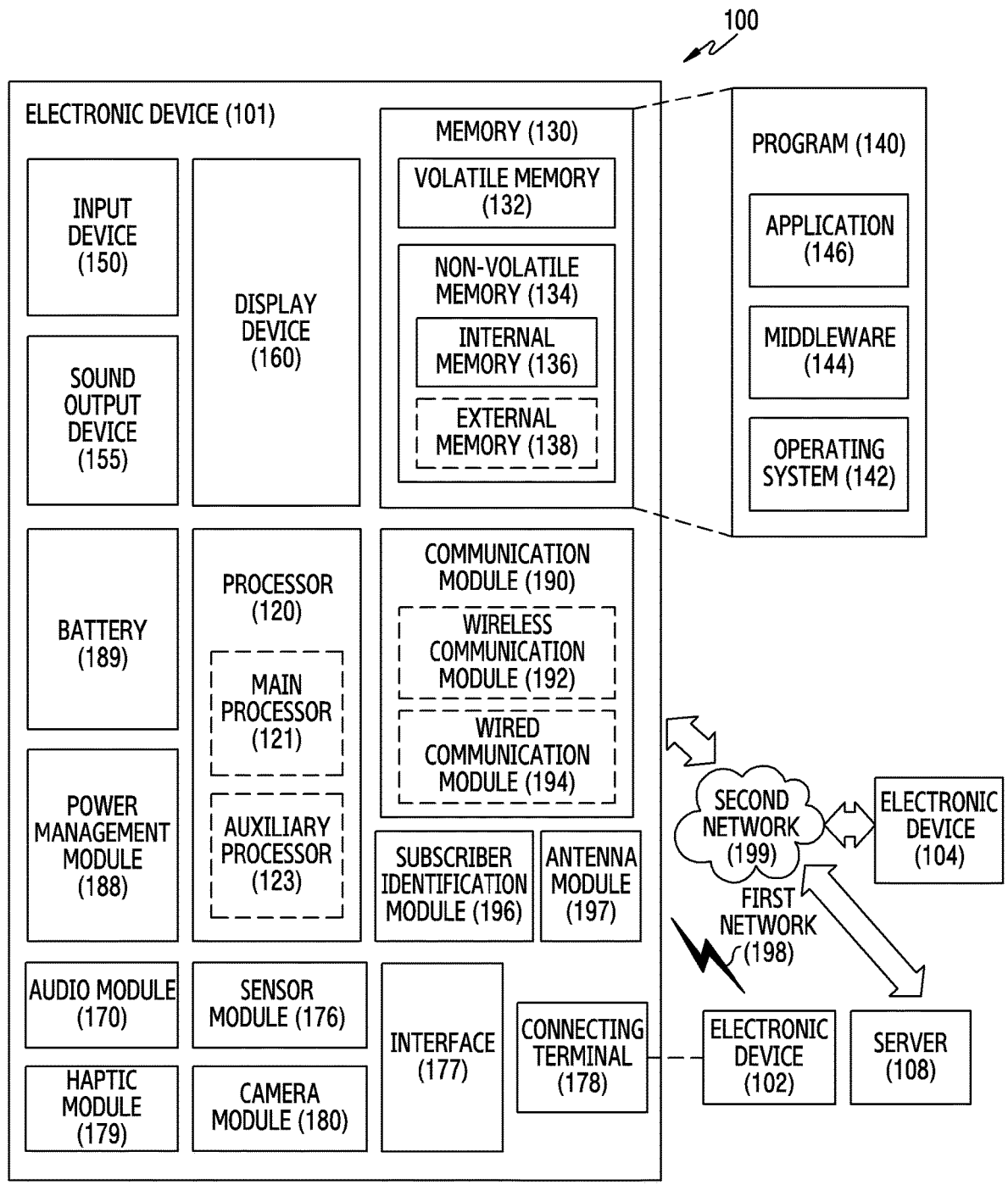
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
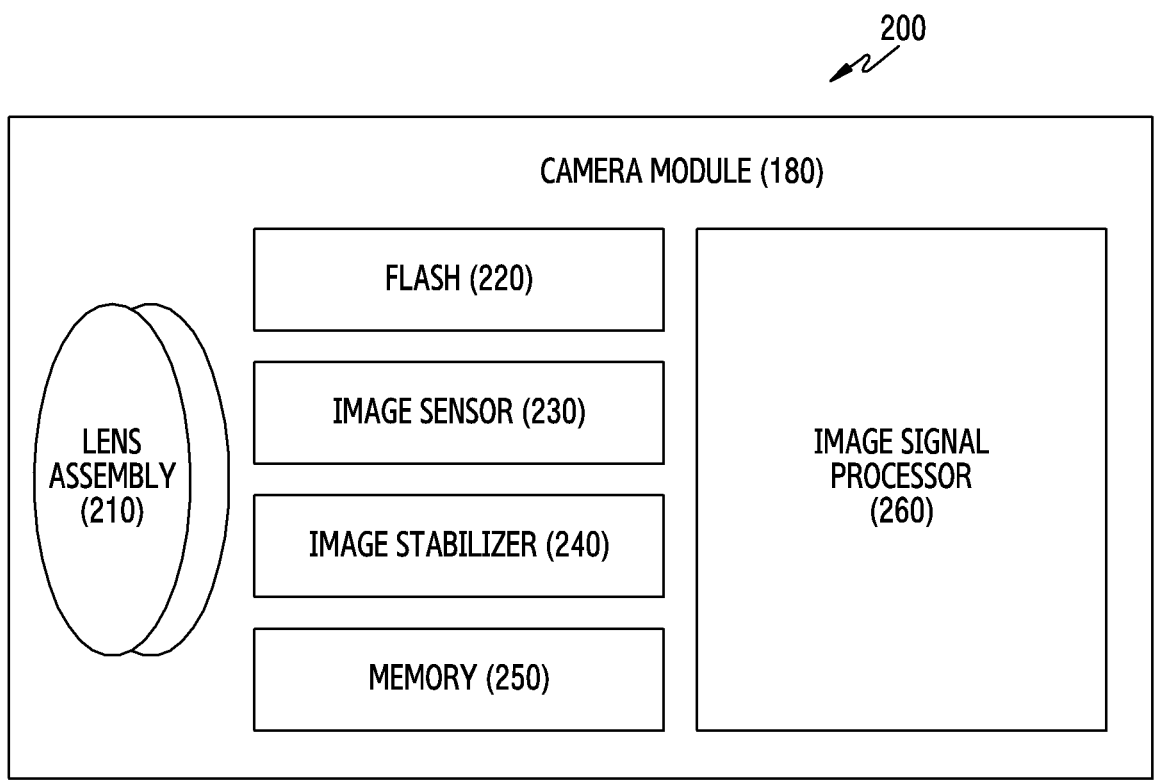
FIG. 2 is a block diagram illustrating a camera module according to an embodiment of the disclosure.

FIG. 2 is a block diagram 200 illustrating a camera module according to an embodiment of the disclosure.

Referring to FIG. 2, the camera module 180 may include a lens assembly 210, a flash 220, an image sensor 230, an image stabilizer 240, a memory 250 (e.g., buffer memory), or an image signal processor 260. The lens assembly 210 may collect light emitted or reflected from an object whose image is to be taken. The lens assembly 210 may include one or more lenses. According to an embodiment of the disclosure, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 240 may detect such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment of the disclosure, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the external electronic device 102, the external electronic device 104, or the server 108) outside the camera module 180. According to an embodiment of the disclosure, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment of the disclosure, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
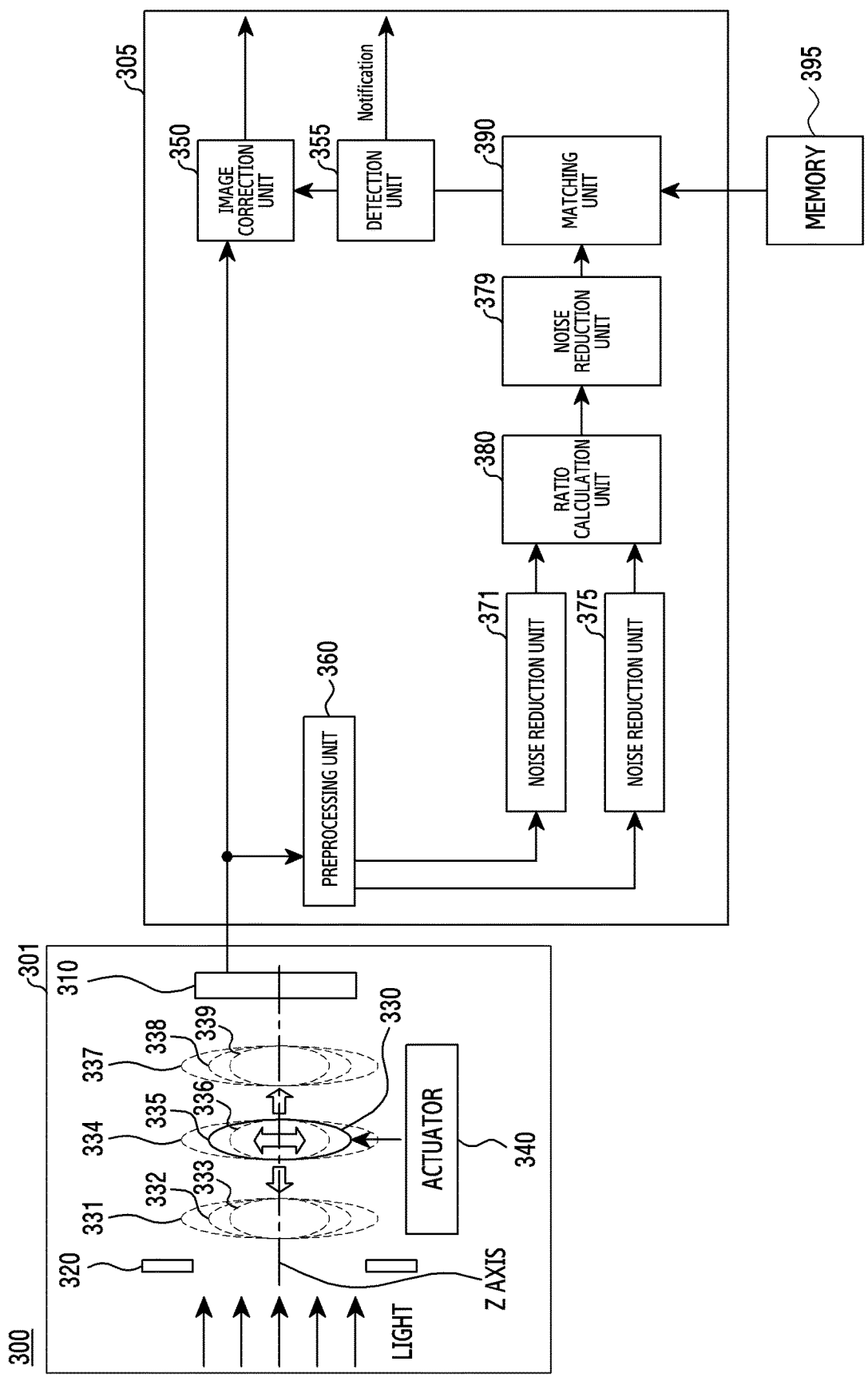
FIG. 3 is a block diagram illustrating a camera module according to an embodiment of the disclosure.

FIG. 3 is a block diagram illustrating a camera module according to an embodiment of the disclosure.

Figure 4:
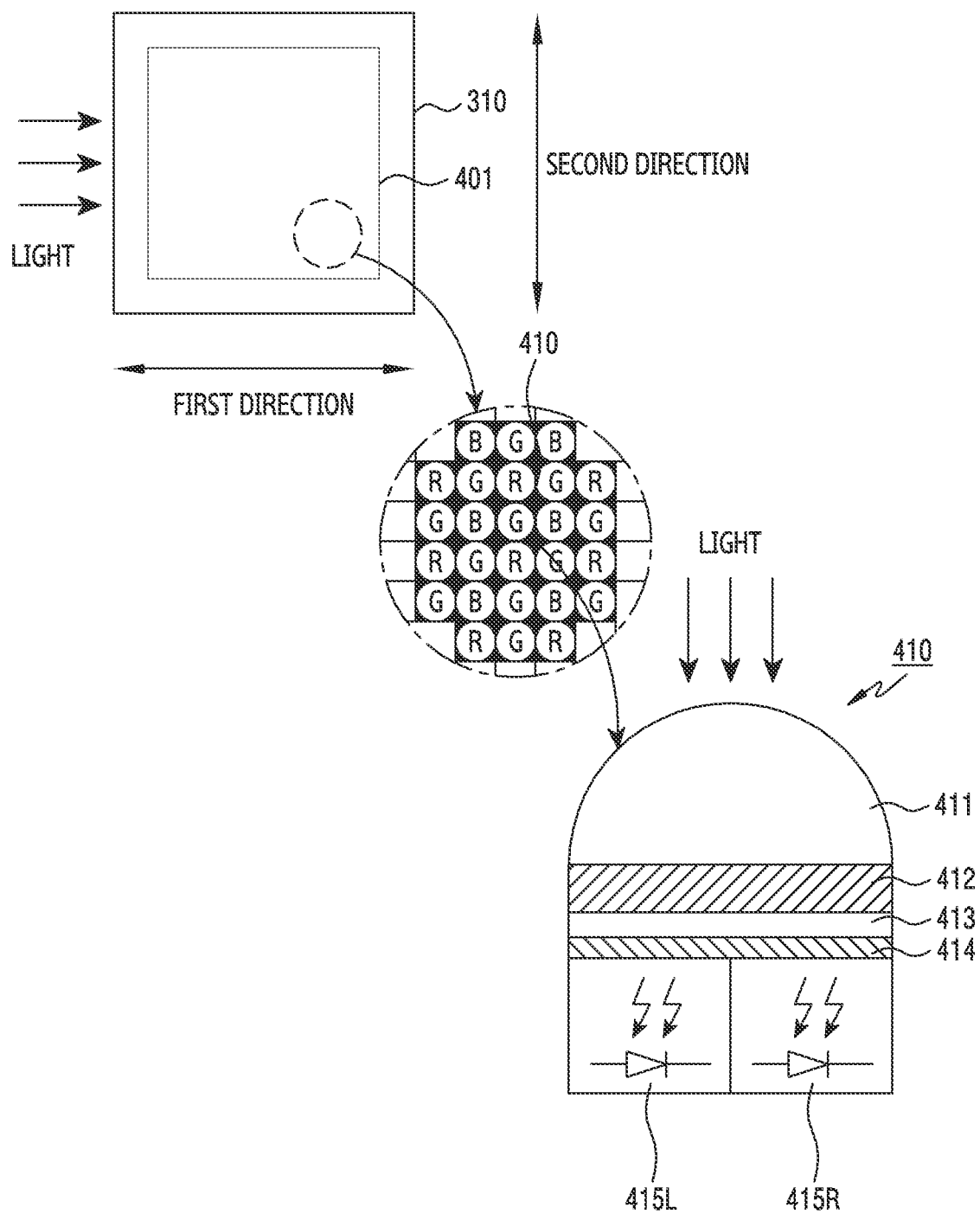
FIG. 4 is a diagram illustrating photodiodes of an image sensor according to an embodiment of the disclosure.

FIG. 4 is a diagram illustrating photodiodes of an image sensor according to an embodiment of the disclosure.

Figure 5:
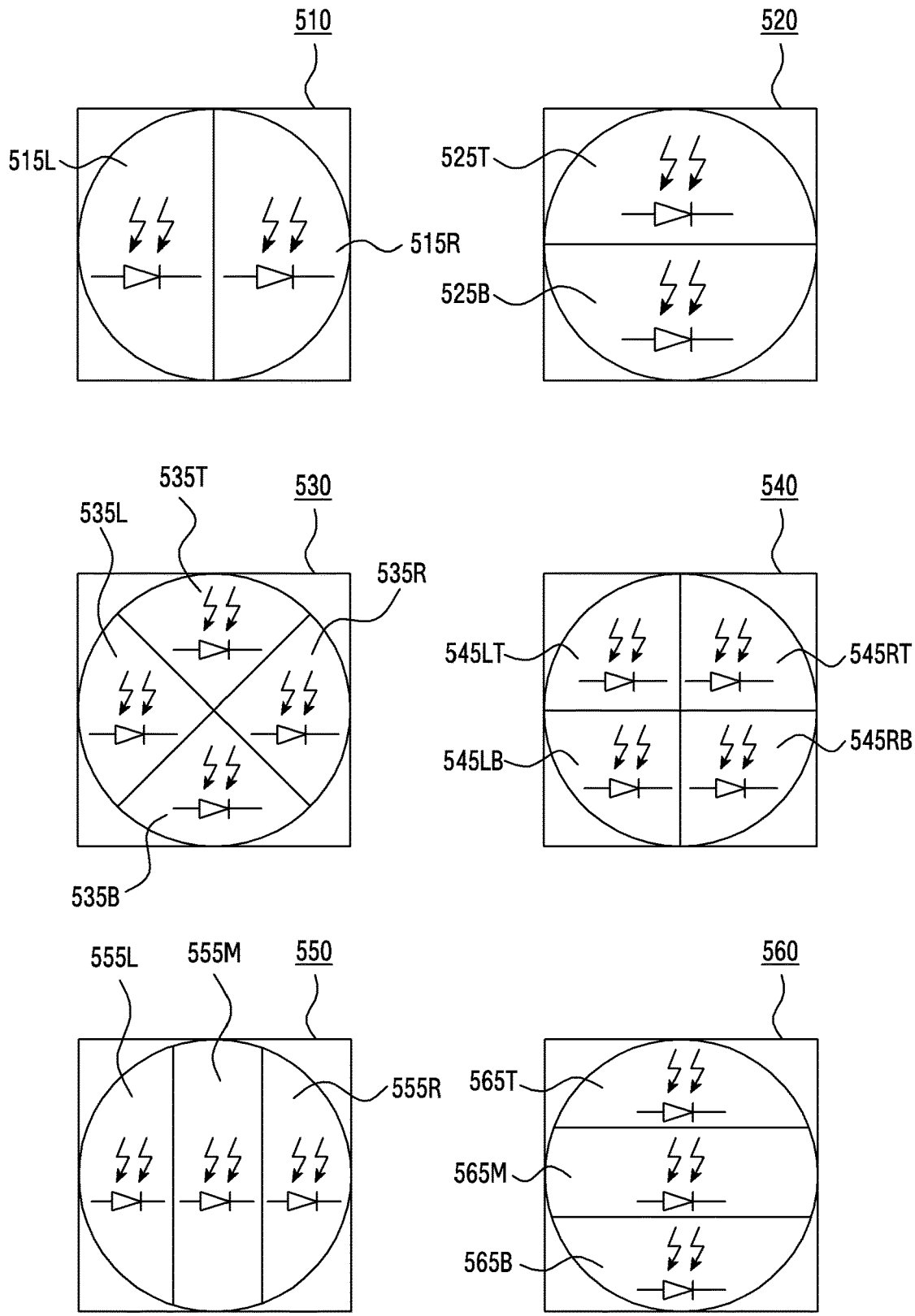
FIG. 5 is a diagram illustrating an array of sub photodiodes of a photodiode according to an embodiment of the disclosure.

FIG. 5 is a diagram illustrating an array of sub photodiodes of a photodiode according to an embodiment of the disclosure.

Figure 6:
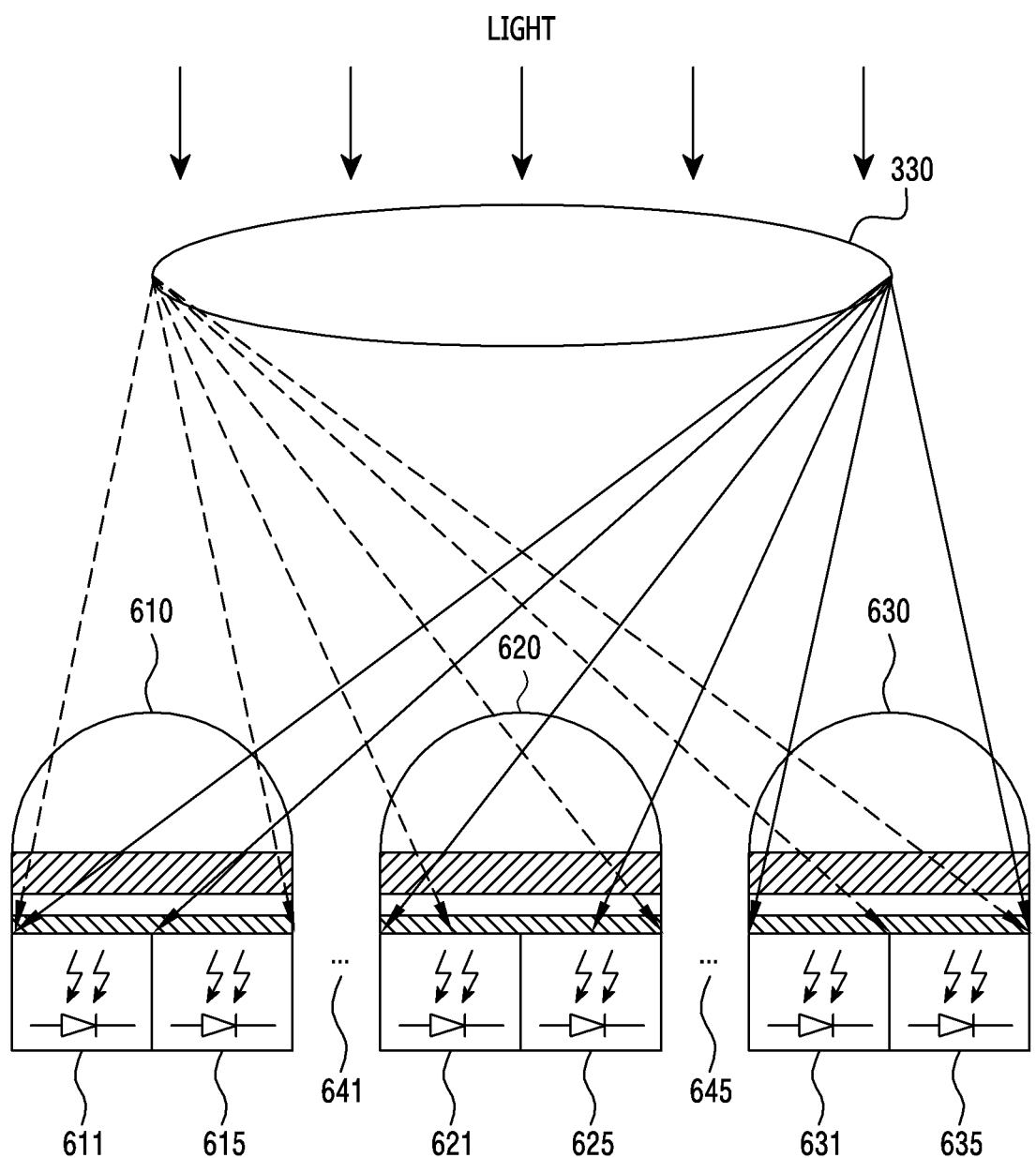
FIG. 6 is a diagram illustrating an amount of incident light on photodiodes according to an embodiment of the disclosure.

FIG. 6 is a diagram illustrating an amount of incident light to photodiodes according to an embodiment of the disclosure.

Figure 7A:
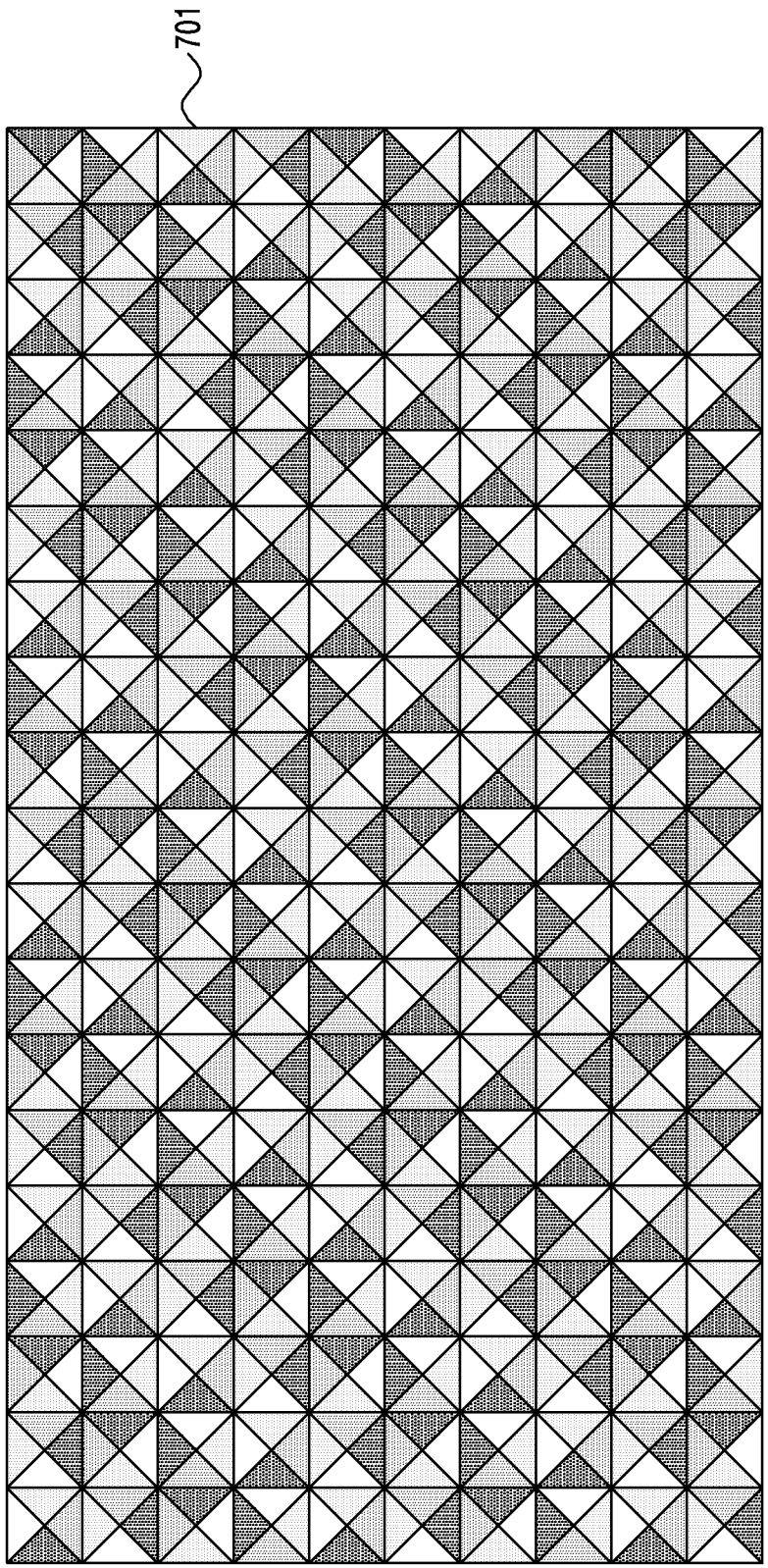
FIG. 7A is a diagram illustrating a raw image acquired by a camera module according to an embodiment of the disclosure.

FIG. 7A is a diagram illustrating a raw image acquired by a camera module 300 according to an embodiment of the disclosure.

Figure 7B:
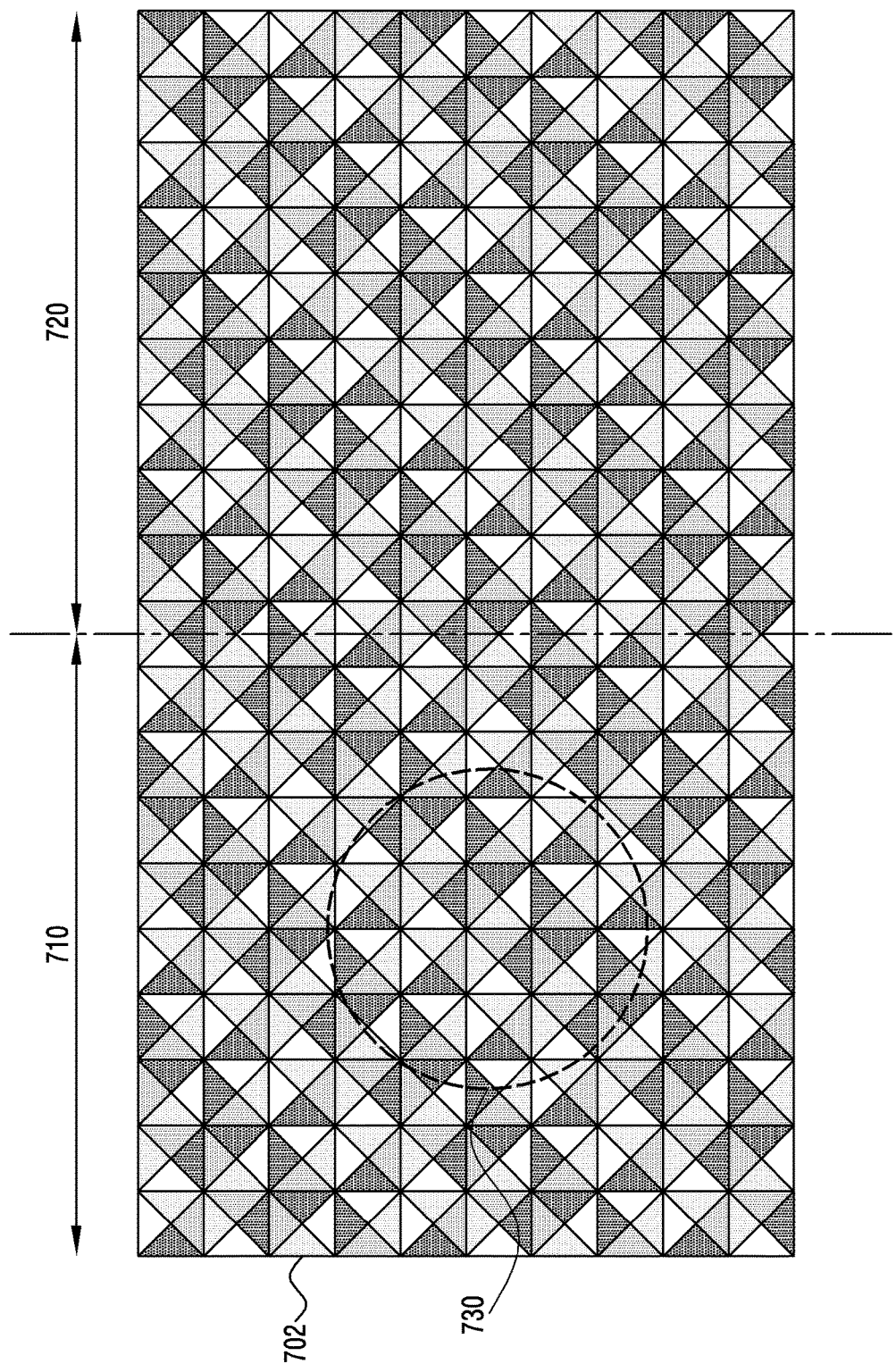
FIG. 7B is a diagram illustrating a first luminance image obtained by first sub photodiodes of a camera module according to an embodiment of the disclosure.

FIG. 7B is a diagram illustrating a first luminance image acquired by first sub photodiodes of a camera module according to an embodiment of the disclosure.

Figure 7C:
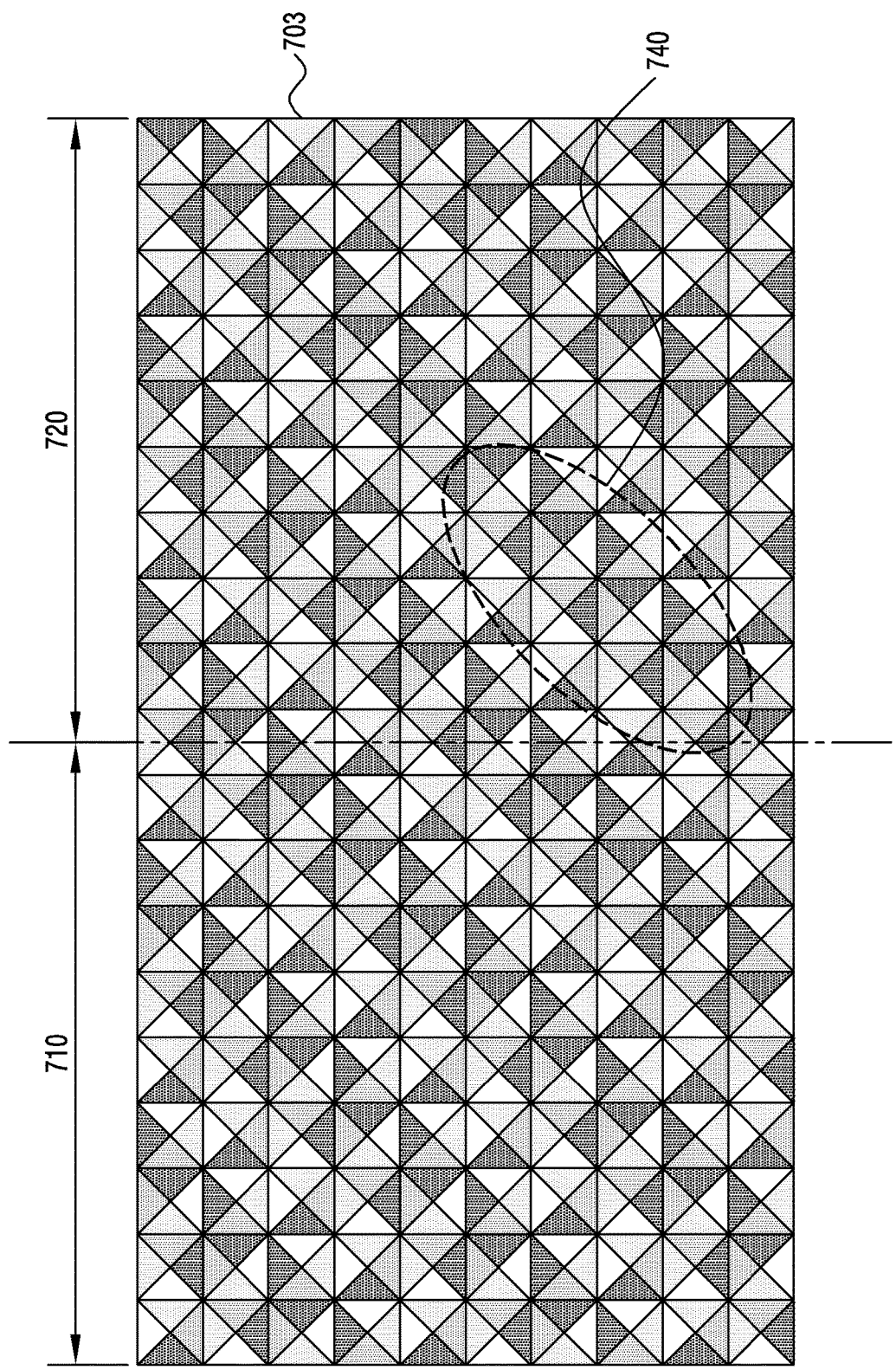
FIG. 7C is a diagram illustrating a second luminance image obtained by second sub photodiodes of a camera module according to an embodiment of the disclosure.

FIG. 7C is a diagram illustrating a second luminance image acquired by second sub photodiodes of the camera module according to an embodiment of the disclosure.

Figure 7D:
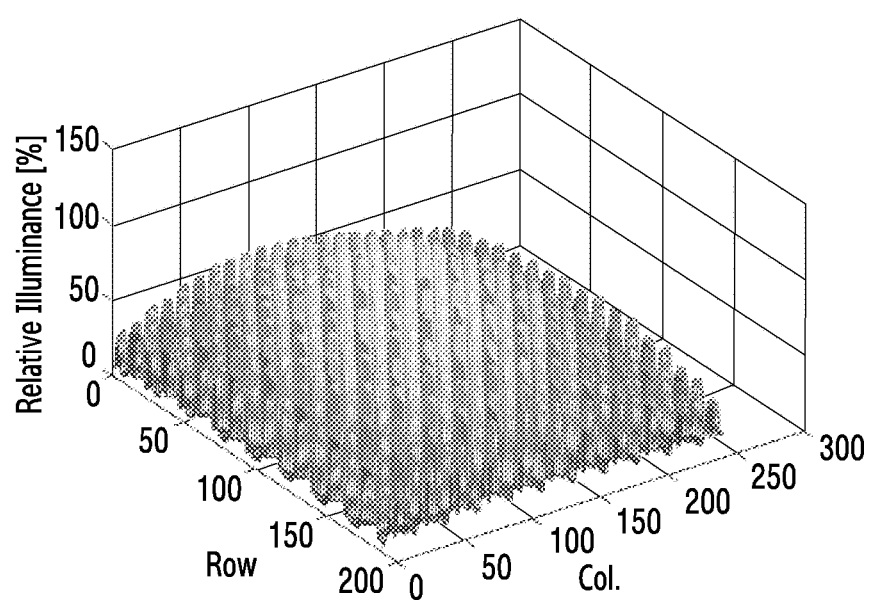
FIG. 7D is a graph showing luminance values of pixels of a first luminance image according to an embodiment of the disclosure.

FIG. 7D is a graph illustrating luminance values of pixels of a first luminance image according to an embodiment of the disclosure.

Figure 7E:
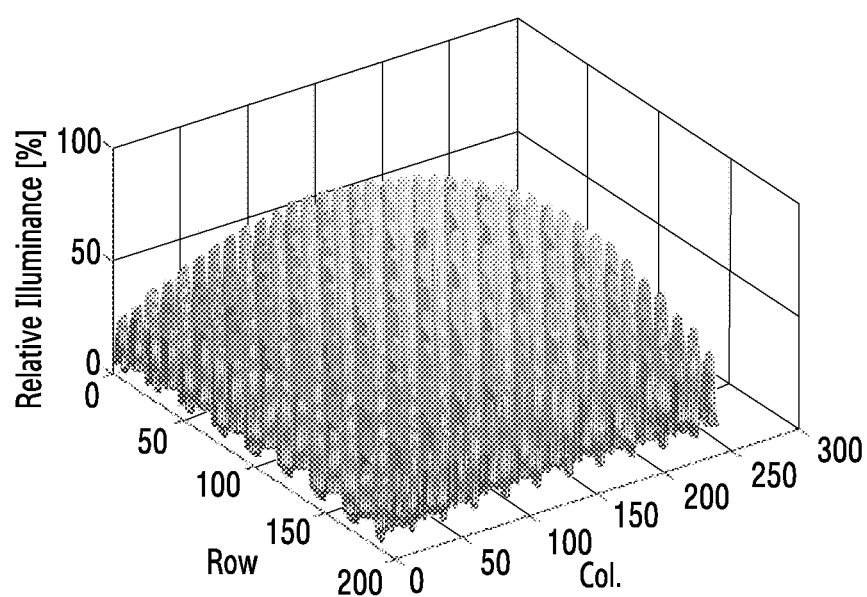
FIG. 7E is a graph showing luminance values of pixels of a second luminance image according to an embodiment of the disclosure.

FIG. 7E is a graph illustrating luminance values of pixels of a second luminance image according to an embodiment of the disclosure.

Figure 7F:
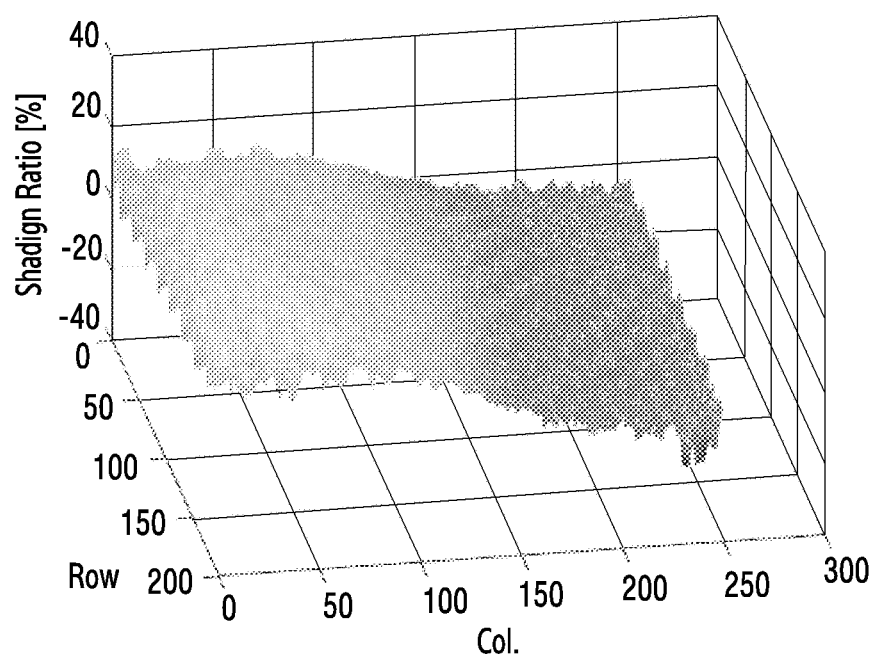
FIG. 7F is a graph showing a raw luminance ratio between luminance values of pixels of a first luminance image and luminance values of pixels of a second luminance image according to an embodiment of the disclosure.

FIG. 7F is a graph illustrating a raw luminance ratio between luminance values of pixels of a first luminance image and luminance values of the pixels of a second luminance image according to an embodiment of the disclosure.

Figure 7G:
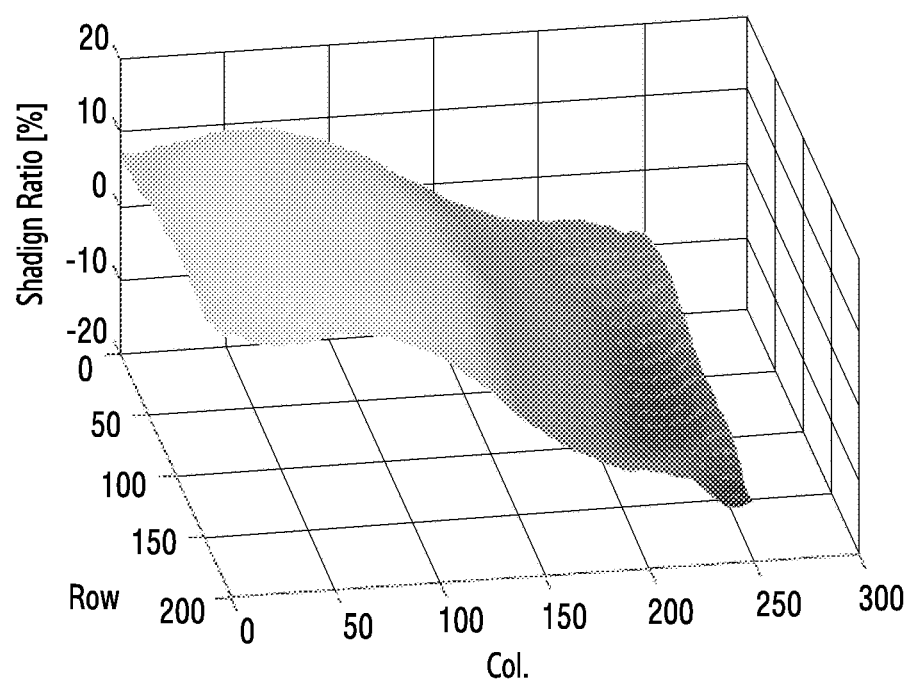
FIG. 7G is a graph showing a luminance ratio obtained by reducing noise of a raw luminance ratio according to an embodiment of the disclosure.

FIG. 7G is a graph illustrating a luminance ratio obtained by reducing noise of a raw luminance ratio according to an embodiment of the disclosure.

Figure 7H:
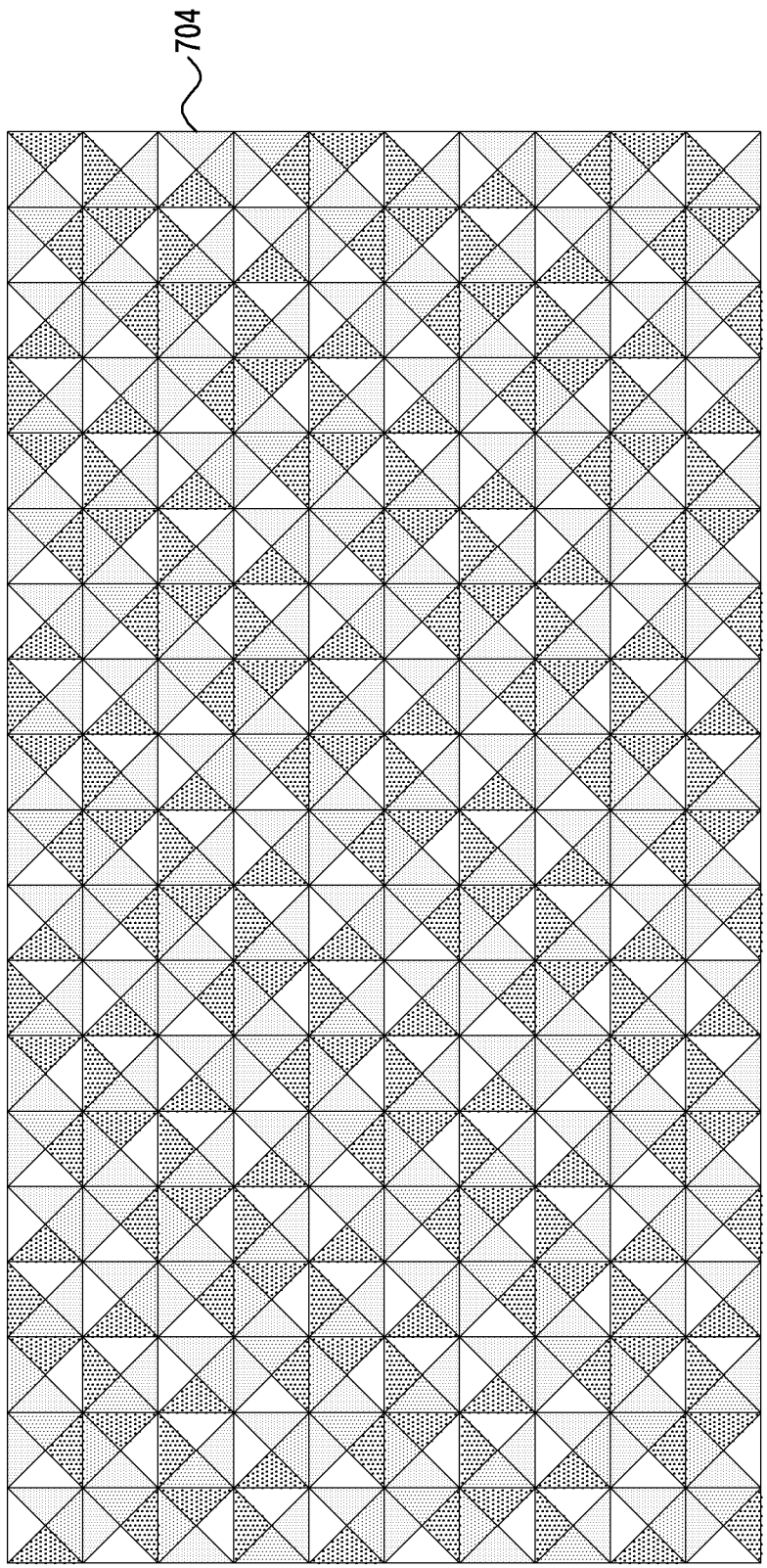
FIG. 7H is a diagram illustrating an image image-signal-processed by a camera module according to an embodiment of the disclosure.

FIG. 7H is a diagram illustrating an image image-signal-processed by a camera module according to an embodiment of the disclosure. In an embodiment of the disclosure, the camera module 300 may correspond to the camera module 180 of FIGS. 1 and 2.

Referring to FIGS. 3 to 7H, in an embodiment of the disclosure, the camera module 300 may include an image acquisition module 301, an image signal processor 305, a memory 395, or a combination thereof. In an embodiment of the disclosure, the image signal processor 305 may correspond to the image signal processor 260 of FIG. 2. In an embodiment of the disclosure, the memory 395 may correspond to the memory 250 of FIG. 2. In an embodiment of the disclosure, the memory 395 may store a plurality of reference luminance ratios corresponding to different optical characteristics (e.g., an F value, a position of a lens 330, or a tilting degree of the lens 330) respectively. In an embodiment of the disclosure, the reference luminance ratio may be a ratio of luminance values between at least two sub images with respect to a reference image pre-acquired to have arbitrary optical characteristics.

In an embodiment of the disclosure, the image acquisition module 301 may include an image sensor 310, an aperture 320, a lens 330, an actuator 340, or a combination thereof. Referring to FIG. 3, it is illustrated that the aperture 320 is positioned in front of the lens 330 (e.g., in a direction relatively close to light), but it is only an example. In an embodiment of the disclosure, the aperture 320 may be positioned between the lens 330 and the image sensor 310. In an embodiment of the disclosure, the lens 330 may include one or more lenses. In an embodiment of the disclosure, the image sensor 310 may correspond to the image sensor 230 of FIG. 2. In an embodiment of the disclosure, the lens 330 may be included in the lens assembly 210 of FIG. 2.

In an embodiment of the disclosure, the image signal processor 305 may include an image correction unit 350, a detection unit 355, a preprocessing unit 360, noise reduction units 371, 375, and 379, a ratio calculation unit 380, a matching unit 390, or a combination thereof. In an embodiment of the disclosure, the image correction unit 350, the detection unit 355, the preprocessing unit 360, the noise reduction units 371, 375, and 379, the ratio calculation unit 380, the matching unit 390, or a combination thereof may be implemented through a hardware circuit. In an embodiment of the disclosure, the image correction unit 350, the detection unit 355, the preprocessing unit 360, the noise reduction units 371, 375, and 379, the ratio calculation unit 380, the matching unit 390, or a combination thereof may be implemented in software operable by the image signal processor 305. FIG. 3 illustrates that two noise reduction units 371 and 375 are connected between the preprocessing unit 360 and the ratio calculation unit 380, but this is only an example. In an embodiment of the disclosure, the number of noise reduction units connected between the preprocessing unit 360 and the ratio calculation unit 380 may correspond to the number of sub photodiodes constituting each of a plurality of photodiodes included in the image sensor 310. In an embodiment of the disclosure, the noise reduction units connected between the preprocessing unit 360 and the ratio calculation unit 380 may reduce noise of outputs of the corresponding sub photodiodes respectively. For example, if the number of sub photodiodes constituting each of the plurality of the photodiodes is 4, the number of the noise reduction units connected between the preprocessing unit 360 and the ratio calculation unit 380 may be 4. In an embodiment of the disclosure, some of the components illustrated in FIG. 3 may be omitted. For example, one or more noise reduction units of the noise reduction units 371, 375, and 379 may be omitted. In an embodiment of the disclosure, if the noise reduction units 371 and 375 of the noise reduction units 371, 375, and 379 are omitted, the output of the preprocessing unit 360 may be inputted to the ratio calculation unit 380. In an embodiment of the disclosure, if the noise reduction unit 379 is omitted from the noise reduction units 371, 375, and 379, the output of the ratio calculation unit 380 may be inputted to the matching unit 390.

In an embodiment of the disclosure, the aperture 320 may adjust a size of an entrance pupil, under control of the image signal processor 305. In an embodiment of the disclosure, as the size of the entrance pupil of the aperture 320 increases, the amount of light reaching the image sensor 310 may increase. In an embodiment of the disclosure, if the size of the entrance pupil of the aperture 320 decreases, the light amount reaching the image sensor 310 may decrease.

In an embodiment of the disclosure, the lens 330 may collect incident light through the aperture 320. In an embodiment of the disclosure, the actuator 340 may move the lens 330 to one of different positions 331 through 339, under control of the image signal processor 305.

In an embodiment of the disclosure, the image sensor 310 may detect a signal corresponding to the light passing through the aperture 320 and the lens 330.

Referring to FIG. 4, the image sensor 310 may include an array 401 of photo diodes (PDs). In an embodiment of the disclosure, the array 401 may include a plurality of PDs 410. In an embodiment of the disclosure, the array 401 may be positioned on a plane perpendicular to the Z axis corresponding to a direction in which light is incoming. In an embodiment of the disclosure, a first direction (e.g., the X-axis direction) of the array 401 may be perpendicular to a second direction (e.g., the Y-axis direction) of the array 401. In an embodiment of the disclosure, the first direction (e.g., the X-axis direction) and the second direction (e.g., the Y-axis direction) may be perpendicular to the Z-axis direction.

In an embodiment of the disclosure, the plurality of the PDs 410 each may include a micro lens 411, an infrared cut-off filter 412, a color filter 413, an antireflection film 414, at least two sub PDs 415L and 415R, or a combination thereof.

The plurality of the PDs 410 each may also be referred to as a light receiving element. In an embodiment of the disclosure, each of the at least two sub PDs of each of the PDs 410 may be referred to as a sub light receiving element. In an embodiment of the disclosure, a PD including at least two sub PDs may also be referred to as a multi-PD.

In an embodiment of the disclosure, the micro lens 411 may condense incident light to the micro lens 411. In an embodiment of the disclosure, the micro lens 411 may adjust a path of the incident light on the micro lens 411 such that the light reaches the first sub PD 415L and the second sub PD 415R.

In an embodiment of the disclosure, the infrared cut-off filter 412 may block infrared ray of at least part of the incident light through the micro lens 411.

In an embodiment of the disclosure, the color filter 413 may pass light of a predesignated color (or, color channel). In an embodiment of the disclosure, the color filter 413 of each of the plurality of the PDs 410 may pass light of one color (e.g., red) of predesignated colors (e.g., red, blue, or green), according to a predesignated pattern (e.g., Bayer pattern). In an embodiment of the disclosure, the color filter 413 may block light of other color than the predesignated color (or, color channel).

In an embodiment of the disclosure, the antireflection layer 414 may prevent the incident light through the micro lens 411 from being reflected to outside.

In an embodiment of the disclosure, the first sub PD 415L and the second sub PD 415R may output a value corresponding to the incident light. In an embodiment of the disclosure, the first sub PD 415L and the second sub PD 415R may output a value corresponding to the incident light based on a photoelectric effect. In an embodiment of the disclosure, the first sub PD 415L and the second sub PD 415R may output a value corresponding to an intensity (or, illuminance) of the incident light based on the photoelectric effect.

In an embodiment of the disclosure, the first sub PD 415L and the second sub PD 415R may generate charges according to the intensity (or, illuminance) of the incident light based on the photoelectric effect. In an embodiment of the disclosure, the first sub PD 415L and the second sub PD 415R may output a current according to an amount of the generated charges. In an embodiment of the disclosure, the value outputted from the first sub PD 415L may also be referred to as a first detection value. In an embodiment of the disclosure, the value outputted from the second sub PD 415R may also be referred to as a second detection value.

In FIG. 4, it is illustrated that the two sub PDs 415L and 415R are disposed on the left side and the right side of one PD 410, but this is only an example. Two or more sub PDs may be included in one PD 410 at different positions.

Referring to FIG. 5, a PD 510 may include a first sub PD 515L disposed on the left side and a second sub PD 515R disposed on the right side. In an embodiment of the disclosure, light having different phases, and/or different intensities (or illuminances) may enter the sub PDs 515L and 515R disposed left and right in a horizontal direction.

Referring to FIG. 5, a photodiode 520 may include a first sub PD 525T disposed at an upper side and a second sub PD 525B disposed at a lower side. In an embodiment of the disclosure, light having different phases, and/or different intensities (or illuminances) may enter the sub PDs 525T and 525B disposed up and down in a vertical direction.

Referring to FIG. 5, a PD 530 may include a first sub PD 535T disposed on an upper side, a second sub PD 535B disposed on a lower side, a third sub PD 535L disposed on a left side, and a fourth sub PD 535R disposed on a right side. The four sub PDs 535T, 535B, 535L, and 535R may receive light having different phases, and/or different intensities (or illuminances) in a horizontal direction and/or a vertical direction. In an embodiment of the disclosure, one pair of the sub PDs 535T and 535L and the other pair of the sub PDs 535B and 535R among the four sub PDs 535T, 535B, 535L, and 535R may receive light having different phases, and/or different intensities (or illuminances) in a first diagonal direction. In an embodiment of the disclosure, one pair of the sub PDs 535B and 535L and the other pair of the sub PDs 535T and 535R among the four sub PDs 535T, 535B, 535L, and 535R may receive light having different phases, and/or different intensities (or illuminances) in a second diagonal direction. In an embodiment of the disclosure, the first diagonal direction and the second diagonal direction may be perpendicular to each other.

Referring to FIG. 5, a PD 540 may include a first sub PD 545LT disposed on an upper left side, a second sub PD 545RT disposed on an upper right side, a third sub PD 545LB disposed on a lower left side, and a fourth sub PD 545RB disposed on a lower right side. The four sub PDs 545LT, 545RT, 545LB, and 545RB may receive light having different phases, and/or different intensities (or illuminances) in the horizontal direction and/or the vertical direction. In an embodiment of the disclosure, the sub PDs 545LT and 545RB positioned in an oblique direction among the four sub PDs 545LT, 545RT, 545LB, and 545RB may receive the light having different phases, and/or different intensities (or illuminances) in a third diagonal direction. In an embodiment of the disclosure, the sub PDs 545RT and 545LB positioned in the oblique direction among the four sub PDs 545LT, 545RT, 545LB, and 545RB may receive the light having different phases, and/or different intensities (or illuminances) in a fourth diagonal direction. In an embodiment of the disclosure, the third diagonal direction and the fourth diagonal direction may be perpendicular to each other.

Referring to FIG. 5, a PD 550 may include a first sub PD 555L disposed on a left side, a second sub PD 555M disposed at the center, and a third sub PD 555R disposed on a right side based on the horizontal direction. The three sub PDs 555L, 555M, and 555R may receive light having different phases, and/or different intensities (or illuminances) in the horizontal direction.

Referring to FIG. 5, a PD 560 may include a first sub PD 565T disposed at an upper side, a second sub PD 565M disposed at the center, and a third sub PD 555B disposed at a lower side along the vertical direction. The three sub PDs 565T, 565M, and 565B may receive light having different phases, and/or different intensities (or illuminances) in the horizontal direction.

In an embodiment of the disclosure, as the light of the different paths enters the sub PDs 415L and 415R of one PD 410, the sub PDs 415L and 415R may output values indicating different light intensities.

Referring to FIG. 6, light may enter PDs 610, 620, and 630 after passing through the lens 330. Referring to FIG. 6, the intensity (or illuminance) of the incident light to the PDs 610, 620, and 630 varies, depending on a position in the lens 330 through which the light passes. Referring to FIG. 6, one or more PDs 641 may be disposed, between the PDs 610 and 620. Referring to FIG. 6, one or more PDs 645 may be disposed, between the PDs 620 and 630.

Referring to FIG. 6, light of different light amounts may enter the sub PDs 611 and 615 of the PD 610. For example, referring to FIG. 6, an area in which the light passing through the left portion of the lens 330 enters the sub PD 615 of the PD 610 may be smaller than an area entering the sub PD 611 of the PD 610. In addition, for example, referring to FIG. 6, an area in which the light passing through the right portion of the lens 330 enters the sub PD 631 of the PD 630 may be smaller than an area entering the sub PD 635 of the PD 630.

As illustrated in FIG. 6, the intensity of the incident light may differ between the sub PDs 611, 615, 621, 625, 631, and 635 of each of the PDs 610, 620, and 630 according to the positions of the PDs 610, 620, and 630. In an embodiment of the disclosure, as the intensity of the incident light differs between the sub PDs 611 and 615 of the PD 610, outputs of the sub PDs 611 and 615 may be different. In an embodiment of the disclosure, as the intensity of the incident light differs between the sub PDs 621 and 625 of the PD 620, outputs of the sub PDs 621 and 625 may be different. In an embodiment of the disclosure, as the intensity of the incident light differs between the sub PDs 631 and 635 of the PD 630, outputs of the sub PDs 631 and 635 may be different.

In an embodiment of the disclosure, the image sensor 310 may provide a value corresponding to the detected light intensity to the image signal processor 305. In an embodiment of the disclosure, the image sensor 310 may provide the image signal processor 350 with the first detection value outputted by the first sub PD 415L and the second detection value outputted by the second sub PD 415R of each of the PDs 410. In an embodiment of the disclosure, the image sensor 310 may provide the image signal processor 305 with a sum value of the first detection value outputted by the first sub PD 415L and the second detection value outputted by the second sub PD 415R of each of the PDs 410. In an embodiment of the disclosure, if providing the sum value to the image signal processor 305, the image sensor 310 may also provide a low-resolution luminance signal to the image signal processor 305. In an embodiment of the disclosure, the low-resolution luminance signal may correspond to a sum value of outputs of adjacent photodiodes in the PDs 410. In an embodiment of the disclosure, the adjacent PDs may be PDs assigned different colors among the adjacent PDs.

In an embodiment of the disclosure, the preprocessing unit 360 may output a luminance signal, based on data (e.g., the first detection value, and the second detection value, or the sum value and the low-resolution luminance signal) from the image sensor 310. In an embodiment of the disclosure, the preprocessing unit 360 may output a first luminance signal corresponding to the first detection value outputted by the first sub PD 415L of each of the PDs 410. In an embodiment of the disclosure, the preprocessing unit 360 may output a second luminance signal corresponding to the second detection value outputted by the second sub PD 415R of each of the PDs 410.

In an embodiment of the disclosure, the sum value of the value outputted by the first sub PD 415L and the value outputted by the second sub PD 415R of each of the PDs 410 may correspond to a raw image 701. In an embodiment of the disclosure, the raw image 701 may be an image obtained by adding a first raw sub image indicated by the value outputted by the first sub PD 415L, and a second raw sub image indicated by the value outputted by the second sub PD 415R of each of the PDs 410. In an embodiment of the disclosure, the position of each of the PDs 410 may be identified based on the image (e.g., the raw image 701). In an embodiment of the disclosure, the positions of the first sub PD 415L and the second sub PD 415R of each of the PDs 410 may be identified based on the image (e.g., the raw image 701). For example, if there is any other pixel adjacent to the left of a random pixel among pixels constituting the image (e.g., the raw image 701), the PD 410 corresponding to any other pixel may be identified as being positioned on the left side of the PD 410 corresponding to the random pixel. In addition, for example, a sub PD adjacent to the PD 410 corresponding to the random pixel among the first sub PD 415L and the second sub PD 415R of the PD 410 corresponding to any other pixel may be identified as being positioned on the left from other sub PDs. In an embodiment of the disclosure, the first luminance signal may correspond to a first luminance image 702. In an embodiment of the disclosure, the second luminance signal may correspond to a second luminance image 703.

In an embodiment of the disclosure, the first luminance image 702 may correspond to the value outputted by the first sub PD 415L positioned at a first position (e.g., a left position of each of the PDs 410) corresponding in each of the PDs 410. In an embodiment of the disclosure, the second luminance image 703 may correspond to the value outputted by the second sub PD 415R positioned at a second position (e.g., a right position of each of the PDs 410) corresponding in each of the PDs 410. In an embodiment of the disclosure, the first position and the second position may be different positions in each of the PDs 410.

In an embodiment of the disclosure, a left region 710 of the first luminance image 702 may be relatively brighter than a right region 720. In an embodiment of the disclosure, the right region 720 of the second luminance image 703 may be relatively brighter than the left region 710. In an embodiment of the disclosure, pixels positioned in the left region 710 of the first luminance image 702 may have higher luminance values than pixels positioned in the left region 710 of the second luminance image 703. In an embodiment of the disclosure, pixels positioned in the right region 720 of the second luminance image 703 may have higher luminance values than pixels positioned in the right region 720 of the first luminance image 702. In an embodiment of the disclosure, the luminance value of each of the pixels of the raw image 701 may correspond to the light intensity identified by each of the PDs 410.

In an embodiment of the disclosure, the preprocessing unit 360 may provide the first luminance image 702 and the second luminance image 703 to the noise reduction unit 371 or 375. In an embodiment of the disclosure, the preprocessing unit 360 may provide the first luminance image 702 to the noise reduction unit 371. In an embodiment of the disclosure, the preprocessing unit 360 may provide the second luminance image 703 to the noise reduction unit 375.

In an embodiment of the disclosure, the noise reduction units 371 and 375 each may reduce noise of the inputted data (e.g., the first luminance image 702 or the second luminance image 703). In an embodiment of the disclosure, the noise reduction units 371 and 375 each may provide noise-reduced data to the ratio calculation unit 380.

In an embodiment of the disclosure, the noise reduction units 371 and 375 each may reduce the noise, by attenuating a high frequency component of the inputted data, using a method of binning, averaging, interpolation, low pass filtering, or a combination thereof. In an embodiment of the disclosure, the inputted data may be out of phase, and the noise reduction units 371 and 375 each may reduce the noise according to the phase, by correcting a phase difference using the method of the binning, the averaging, the interpolation, the low pass filtering or a combination thereof.

In an embodiment of the disclosure, the ratio calculation unit 380 may calculate a raw luminance ratio of the noise-reduced data (e.g., the first luminance image 702 and the second luminance image 703 with the noise reduced) from the noise reduction units 371 and 375.

In an embodiment of the disclosure, the ratio calculation unit 380 may calculates a raw luminance ratio between luminance values of pixels at corresponding positions among the pixels of the first luminance image 702 and the second luminance image 703 with the noise reduced. In an embodiment of the disclosure, the ratio calculation unit 380 may calculate a raw luminance ratio between a luminance value of an i-th pixel of the noise-reduced first luminance image 702 and a luminance value of a i-th pixel of the noise-reduced second luminance image 703. In an embodiment of the disclosure, i may be an integer which is equal to or greater than 1 and equal to or less than the number of the pixels of the first luminance image 702 (or the second luminance image 703).

In an embodiment of the disclosure, the ratio calculation unit 380 may calculate the raw luminance ratio, using the following Equation 1.

$$SR0(i) = \frac{Y_1(i)}{Y_2(i)} \qquad \text{Equation 1}$$

In Equation 1, SR0(i) may denote the raw luminance ratio between the luminance value of the i-th pixel of the noise-reduced first luminance image 702 and the luminance value of the i-th pixel of the noise-reduced second luminance image 703. In Equation 1, Y1(i) may denote the luminance value of the i-th pixel of the first luminance image 702. In Equation 1, Y2(i) may denote the luminance value of the i-th pixel of the second luminance image 703.

In an embodiment of the disclosure, the ratio calculation unit 380 may calculate the raw luminance ratio, using the following Equation 2.

$$SR0(i) = \frac{Y_1(i) - Y_2(i)}{Y_1(i) + Y_2(i)} \qquad \text{Equation 2}$$

In Equation 2, SR0(i) may denote the raw luminance ratio between the luminance value of the i-th pixel of the noise-reduced first luminance image 702 and the luminance value of the i-th pixel of the noise-reduced second luminance image 703. In Equation 2, Y1(i) may denote the luminance value of the i-th pixel of the first luminance image 702. In Equation 2, Y2(i) may denote the luminance value of the i-th pixel of the second luminance image 703.

In an embodiment of the disclosure, if the PDs each include sub PDs in two or more predesignated number, luminance images may be generated in the predesignated number. In an embodiment of the disclosure, if the luminance images are generated in the predesignated number, the ratio calculation unit 380 may calculate the raw luminance ratio, using the following Equation 3.

$$SR0_{jk}(i) = \frac{Y_j(i)}{Y_k(i)} \qquad \text{Equation 3}$$

In Equation 3, SR0jk(i) may denote a raw luminance ratio between a luminance value of an i-th pixel of a j-th luminance image and a luminance value of an i-th pixel of a k-th luminance image among the predesignated number of the noise-reduced luminance images. In Equation 3, Yj(i) may denote the luminance value of the i-th pixel of the j-th luminance image. In Equation 3, Yk(i) may denote the luminance value of the i-th pixel of the k-th luminance image. In an embodiment of the disclosure, the j-th luminance image may be an image generated by a detection value of the j-th sub PD of each of the PDs. In an embodiment of the disclosure, the k-th luminance image may be an image generated by a detection value of the k-th sub PD of each of the PDs.

In an embodiment of the disclosure, if the predesignated number of the luminance images are generated, the ratio calculation unit 380 may calculate the raw luminance ratio, using the following Equation 4.

$$SR0_{jk}(i) = \frac{Y_j(i) - Y_k(i)}{Y_j(i) + Y_k(i)} \qquad \text{Equation 4}$$

In Equation 4, SR0jk(i) may denote the raw luminance ratio between the luminance value of the i-th pixel of the j-th luminance image and the luminance value of the i-th pixel of the k-th luminance image among the predesignated number of the noise-reduced luminance images. In Equation 4, Yj(i) may denote the luminance value of the i-th pixel of the j-th luminance image. In Equation 4, Yk(i) may denote the luminance value of the i-th pixel of the k-th luminance image. In an embodiment of the disclosure, the j-th luminance image may be an image generated by the detection value of the j-th sub PD of each of the PDs. In an embodiment of the disclosure, the k-th luminance image may be an image generated by the detection value of the k-th sub PD of each of the PDs.

In an embodiment of the disclosure, the ratio calculation unit 380 may calculate the raw luminance ratios of the luminance values of the pixels of the first luminance image 702 as shown in FIG. 7D and the luminance values of the pixels of the second luminance image 703 as shown in FIG. 7E, as shown in FIG. 7F.

Referring to FIG. 7D, luminance values of pixels of a portion corresponding to columns of a left portion may be greater than luminance values of pixels of a portion corresponding to columns of a right portion in the first luminance image 702. Referring to FIG. 7E, luminance values of pixels in a portion corresponding to columns of a right portion may be greater than luminance values of pixels in a portion corresponding to columns of a left portion in the second luminance image 703. Referring to FIG. 7F, as the columns increase from the left to the right, the first ratio tends to decrease.

In an embodiment of the disclosure, the ratio calculation unit 380 may provide the calculated raw luminance ratio to the noise reduction unit 379.

In an embodiment of the disclosure, the noise reduction unit 379 may reduce noise due to the color of the subject by using a method of tuning, averaging, low pass filtering, or a combination thereof with respect to the raw luminance ratio. In an embodiment of the disclosure, the noise reduction unit 379 may reduce noise due to the color of the subject for each of the raw luminance ratios corresponding to the PDs 410 assigned the same color among the raw luminance ratios.

Referring to FIG. 7G, it may be noted that the noise of the raw luminance ratio identified in FIG. 7F is reduced by the noise reduction unit 379.

In an embodiment of the disclosure, the noise reduction unit 379 may provide the matching unit 390 with the noise-reduced luminance ratio with respect to the raw luminance ratio.

In an embodiment of the disclosure, the matching unit 390 may identify a reference luminance ratio corresponding to optical characteristics (e.g., an F value, a lens position, or a lens tilting degree) in acquiring the raw image 701 among the reference ratios stored in the memory 395. In an embodiment of the disclosure, the matching unit 390 may identify the reference luminance ratio, by comparing the reference luminance ratios stored in the memory 395 with the luminance ratio. In an embodiment of the disclosure, the identified reference luminance ratio may be a reference luminance ratio having the smallest difference from the luminance ratio among the plurality of the reference luminance ratios. In an embodiment of the disclosure, the matching unit 390 may identify the reference luminance ratio corresponding to the optical characteristics (e.g., an F value, a lens position, or a lens tilting degree) in acquiring the raw image 701, based on information indicating the optical characteristics of the identified reference luminance ratio.

In an embodiment of the disclosure, the matching unit 390 may identify a difference value between the luminance ratio and the identified reference luminance ratio. In an embodiment of the disclosure, the matching unit 390 may identify the difference value between the luminance ratio and the identified reference luminance ratio, using the following Equation 5.

$$\Delta SR(i) = |SR(i) - SR_{ref}(i)| \qquad \text{Equation 5}$$

In Equation 5, ΔSR(i) may denote a difference value between the luminance ratio of the i-th pixel and the identified reference luminance ratio. In Equation 5, ΔSR(i) may correspond to an absolute value of the difference value between the luminance ratio of the i-th pixel and the identified reference luminance ratio. In Equation 5, SR(i) may denote a luminance ratio with the noise removed.

In Equation 5, SRref(i) may denote the reference luminance ratio of the i-th pixel.

In an embodiment of the disclosure, the matching unit 390 may provide the detection unit 355 with information of the luminance ratio, the identified reference luminance ratio, the difference value, or a combination thereof.

In an embodiment of the disclosure, the detection unit 355 may detect at least one defect (or, noise) in the raw image 701, based on the information of the luminance ratio, the identified reference luminance ratio, the difference value, or a combination thereof. In an embodiment of the disclosure, the defect (or, noise) may be caused by a flare due to a light source of high luminous intensity, saturation of the image sensor 310, a foreign substance of the lens 330, or a combination thereof.

In an embodiment of the disclosure, the detection unit 355 may detect the defect (or, noise) due to a foreign substance in the raw image 701, based on an average value of the difference value ΔSR(i). In an embodiment of the disclosure, if the average value of the difference value ΔSR(i) is greater than a predesignated reference average value, the detection unit 355 may determine presence of the defect (or, noise) due to the foreign substance in the raw image 701. In an embodiment of the disclosure, if the average value of the difference value ΔSR(i) satisfies the following Equation 6, the detection unit 355 may determine the defect due to the foreign substance in the raw image 701.

$$\frac{\sum_{i=1}^{N} \Delta SR(i)}{N} > SR_{fo} \qquad \text{Equation 6}$$

In Equation 6, ΔSR(i) may denote a difference value between a second ratio of the i-th pixel of the pixels of the raw image 701 and the identified reference ratio. In Equation 6, N may correspond to the number of the pixels of the raw image 701. In Equation 6, SRfo may denote a predesignated reference average value.

In an embodiment of the disclosure, the detection unit 355 may detect the defect (or, noise) caused by the flare in the raw image 701, based on the difference value ΔSR(i). In an embodiment of the disclosure, if the difference value ΔSR(i) is greater than the predesignated reference difference value, the detection unit 355 may determine the defect (or, noise) due to the flare in the raw image 701. In an embodiment of the disclosure, the detection unit 355 may determine a pixel having the difference value ΔSR(i) greater than the predesignated reference difference value among the pixels of the raw image 701 as a pixel having the defect (or, noise) caused by the flare. In an embodiment of the disclosure, the detection unit 355 may determine the pixel having the difference value ΔSR(i) which satisfies the following Equation 7 as the pixel having the defect (or, noise) caused by the flare.

$$\Delta SR(i) > SR_{fl} \qquad \text{Equation 7}$$

In Equation 7, ΔSR(i) may denote the difference value between the luminance ratio of the i-th pixel among the pixels of the raw image 701 and the identified reference luminance ratio. In Equation 7, SRfl may denote the predesignated reference difference value.

In an embodiment of the disclosure, the detection unit 355 may detect a defect (or, noise) due to the saturation in the raw image 701, based on the difference value ΔSR(i).

In an embodiment of the disclosure, the luminance ratio of each of the pixels of the raw image 701 may be equal to the reference luminance ratio, until at least one sub PD of the sub PDs 415L and 415R included in each of the PDs 410 is saturated.

In an embodiment of the disclosure, if the PD 410 is implemented with the two sub PDs 415L and 415R, both of the two sub PDs 415L and 415R may be unsaturated, one sub PD of the two sub PDs 415L and 415R may be saturated and the other sub PD may be unsaturated, or both of the two sub PDs 415L and 415R may be saturated. In an embodiment of the disclosure, the relationship depending on whether each of the two sub PDs 415L and 415R is saturated may be expressed as the following Equations 8 or 9.

$$SR_{ref}(i) = SR_1(i) < SR_2(i) < SR_3(i) = 1 \qquad \text{Equation 8}$$

In an embodiment of the disclosure, Equation 8 may express the change of the luminance ratio according to the increase of the light amount, if the light amount recognized by the first sub PD 415L among the sub PDs 415L and 415R of the PD 410 is less than the light amount recognized by the second sub PD 415R. In Equation 8, SRref(i) may denote the reference luminance ratio of the i-th pixel. In Equation 8, SR1(i) may denote the luminance ratio of the i-th pixel corresponding to the corresponding PD 410, if all of the sub PDs 415L and 415R are unsaturated. In Equation 8, SR2(i) may denote the luminance ratio of the i-th pixel corresponding to the corresponding PD 410, if the second sub PD 415R is saturated and the first sub PD 415L is unsaturated. In Equation 8, SR3(i) may denote the luminance ratio of the i-th pixel corresponding to the corresponding PD 410, if all of the sub PDs 415L and 415R are saturated.

$$1 = SR_3(i) < SR_2(i) < SR_1(i) = SR_{ref}(i) \qquad \text{Equation 9}$$

In an embodiment of the disclosure, Equation 9 may express the change of the luminance ratio according to the increase of the light amount, if the light amount recognized by the first sub PD 415L among the sub PDs 415L and 415R of the PD 410 is greater than the light amount recognized by the second sub PD 415R. In Equation 9, SRref(i) may denote the reference luminance ratio of the i-th pixel. In Equation 9, SR1(i) may denote the luminance ratio of the i-th pixel corresponding to the corresponding PD 410, if all of the sub PDs 415L and 415R are unsaturated. In Equation 9, SR2(i) may denote the luminance ratio of the i-th pixel corresponding to the corresponding PD 410, if the first sub PD 415RL is saturated and the second sub PD 415R is unsaturated. In Equation 9, SR3(i) may denote the luminance ratio of the i-th pixel corresponding to the corresponding PD 410, if all of the sub PDs 415L and 415R are saturated.

In an embodiment of the disclosure, referring to Equations 8 and 9, if all of the sub PDs 415L and 415R have the unsaturation state, the luminance ratio of the pixel corresponding to the corresponding PD 410 may be equal to the reference luminance ratio. In an embodiment of the disclosure, referring to Equations 8 and 9, if all of the sub PDs 415L and 415R have the saturation state, the luminance ratio of the pixel corresponding to the corresponding PD 410 may be equal to 1. In an embodiment of the disclosure, referring to Equations 8 and 9, if one sub PD of the sub PDs 415L and 415R has the saturation state and the other sub PD has the unsaturation state, the luminance ratio of the pixel corresponding to the corresponding PD 410 may have a value between the reference luminance ratio and 1. In an embodiment of the disclosure, the luminance ratio may be greater than 1, or smaller than 1.

Considering such optical characteristics, the difference value ΔSR(i) may have a value between 0 and a value acquired by subtracting the reference luminance ratio from 1, if the reference luminance ratio is 1 or less, or may have a value between 0 and a value acquired by subtracting 1 from the reference luminance ratio, if the reference luminance ratio exceeds 1.

In an embodiment of the disclosure, the detection unit 355 may identify a saturation level of the pixel having the corresponding difference value ΔSR(i) depending on which one of the value of 0, the value between 0 and the value obtained by subtracting the reference luminance ratio from 1, or the value obtained by subtracting the reference luminance ratio from 1 the difference value ΔSR(i) corresponds to. The detection unit 355 may determine a pixel of which the difference value ΔSR(i) has other value than 0 as the pixel having the defect (or, noise) due to the saturation.

In an embodiment of the disclosure, if the raw image 701 has the defect (or, noise) due to the saturation, the detection unit 355 may estimate the luminance of the pixel having the defect (or, noise) due to the saturation. In an embodiment of the disclosure, the image correction unit 350 may estimate the luminance value of the pixel having the defect (or, noise) due to the saturation in the raw image 701, using the following Equations 10 or 11.

$$Y(i) = Y_1(i) \times \left(1 + \frac{1}{SR_{ref}(i)}\right) \quad \text{Equation 10}$$

In an embodiment of the disclosure, Equation 10 may be the equation for estimating the luminance value of the pixel having the defect (or, noise) due to the saturation, if the light amount recognized by the first sub PD 415L among the sub PDs 415L and 415R of the PD 410 is less than the light amount recognized by the second sub PD 415R, and the second sub PD 415R is saturated (i.e., if the luminance value Y2(i) of the i-th pixel of the second luminance image 703 has the saturation state value). In Equation 10, Y(i) may denote the luminance value of the i-th pixel of the raw image 701. In Equation 10, Y1(i) may denote the luminance value of the i-th pixel of the first luminance image 702. In Equation 10, SRref(i) may denote the reference luminance ratio of the i-th pixel.

$$Y(i) = Y_2(i) \times \left(1 + \frac{1}{SR_{ref}(i)}\right) \quad \text{Equation 11}$$

In an embodiment of the disclosure, Equation 11 may be the equation for estimating the luminance value of the pixel having the defect (or, noise) due to the saturation, if the light amount recognized by the second sub PD 415R among the sub PDs 415L and 415R of the PD 410 is less than the light amount recognized by the first sub PD 415L, and the first sub PD 415L is saturated (i.e., if the luminance value Y1(i) of the i-th pixel of the first luminance image 702 has the saturation state value). In Equation 11, Y(i) may denote the luminance value of the i-th pixel of the raw image 701. In Equation 11, Y2(i) may denote the luminance value of the i-th pixel of the second luminance image 703. In Equation 11, SRref(i) may denote the reference luminance ratio of the i-th pixel.

In an embodiment of the disclosure, the detection unit 355 may transmit information of at least one defect (or, noise) detected in the raw image 701 to other component (e.g., the image correction unit 350, the processor 120 of FIG. 1, the application 146 of FIG. 1) of the electronic device 201.

In an embodiment of the disclosure, the detection unit 355 may transmit the estimated luminance value of the pixel having at least one defect (or, noise) due to the saturation detected in the raw image 701 to other component (e.g., the image correction unit 350, the processor 120 of FIG. 1, the application 146 of FIG. 1) of the electronic device 201.

In an embodiment of the disclosure, the image correction unit 350 may correct the value of each of the pixels of the raw image 701, based on the information of at least one defect (or, noise). In an embodiment of the disclosure, the image correction unit 350 may correct the values of the pixels of the first raw sub image and the second raw sub image, based on the information of at least one defect (or, noise).

In an embodiment of the disclosure, if the raw image 701 has a defect (or, noise) due to a foreign substance, the image correction unit 350 may correct the values of the pixels of the raw image 701, based on a correction value corresponding to the luminance ratio of each of the pixels of the raw image 701. In an embodiment of the disclosure, if the raw image 701 has the defect (or, noise) due to the foreign substance, the image correction unit 350 may correct the values of the pixels of the raw image 701, based on a correction value corresponding to the difference value ΔSR(i) of each of the pixels of the raw image 701.

In an embodiment of the disclosure, if the raw image 701 has a defect (or, noise) due to a flare, the image correction unit 350 may correct a pixel value having the defect (or, noise) due to the flare, based on values of pixels around the pixel having the defect (or, noise) due to the flare. In an embodiment of the disclosure, the image correction unit 350 may correct the pixel value having the defect (or, noise) due to the flare, based on values of high-reliability pixels among the pixels around the pixel having the defect (or, noise) due to the flare. In an embodiment of the disclosure, the reliability of the pixels may be determined in response to the difference value ΔSR(i) of the pixels. In an embodiment of the disclosure, the image correction unit 350 may identify as the pixel having high reliability as the difference value ΔSR(i) is close to 0. In an embodiment of the disclosure, the image correction unit 350 may identify as the pixel having low reliability as the difference value ΔSR(i) is far from 0.

In an embodiment of the disclosure, the image correction unit 350 may determine an average value of the values of the pixels around the pixel having the defect (or, noise) due to the flare, as the value of the pixel having the defect (or, noise) due to the flare. In an embodiment of the disclosure, the image correction unit 350 may correct an average value of values of high-reliability pixels among the pixels around the pixel having the defect (or, noise) due to the flare, with the value of the pixel having the defect (or, noise) due to the flare. In an embodiment of the disclosure, the neighboring pixels may be pixels within a predesignated distance from the pixel having the defect (or, noise) due to the flare among the pixels. In an embodiment of the disclosure, a distance between a random pixel and a pixel (a neighboring pixel) adjacent to the random pixel may be 1. In an embodiment of the disclosure, a distance between a random pixel and a pixel adjacent to a neighboring pixel of the random pixel may be 2. In an embodiment of the disclosure, the pixels with high reliability may be pixels having the difference value ΔSR(i)

less than a predesignated value among the pixels near the pixel having the defect (or, noise) due to the flare.

In an embodiment of the disclosure, the processor 120 may notify a notification to the user, based on information of at least one defect (or, noise) detected in the raw image 701. In an embodiment of the disclosure, the processor 120 may notify the user of the notification corresponding to the type of the detected defect (or, noise). In an embodiment of the disclosure, if the detected defect (or, noise) is a foreign substance, the processor 120 may notify the user of a notification requesting to remove the foreign substance from a portion (e.g., a window covering the camera module 300) through which the light passes in the camera module 300. In an embodiment of the disclosure, if the detected defect (or, noise) is the flare, the processor 120 may notify the user of a notification requesting the user to reduce the light amount of the light source.

In an embodiment of the disclosure, the processor 120 may control auto focus, auto exposure, or a combination thereof, based on information of at least one defect (or, noise) detected in the raw image 701. In an embodiment of the disclosure, if the detected defect (or, noise) is the saturation, the processor 120 may reduce the exposure of the image sensor 310 to avoid the saturation.

In an embodiment of the disclosure, the processor 120 may change application of the light source effect, based on information of at least one defect (or, noise) detected in the raw image 701. In an embodiment of the disclosure, the processor 120 may apply different light source effects (e.g., an effect of light splitting) to the raw image 701, depending on the saturation level (e.g., whether the sub PDs 415L and 415 are all unsaturated, partially saturated, or all unsaturated).

FIG. 7H may illustrate an image 704 converted into color data (e.g., RGB data) after at least one defect (or, noise) of the raw image 701 of FIG. 7A is corrected.

Figure 8A:
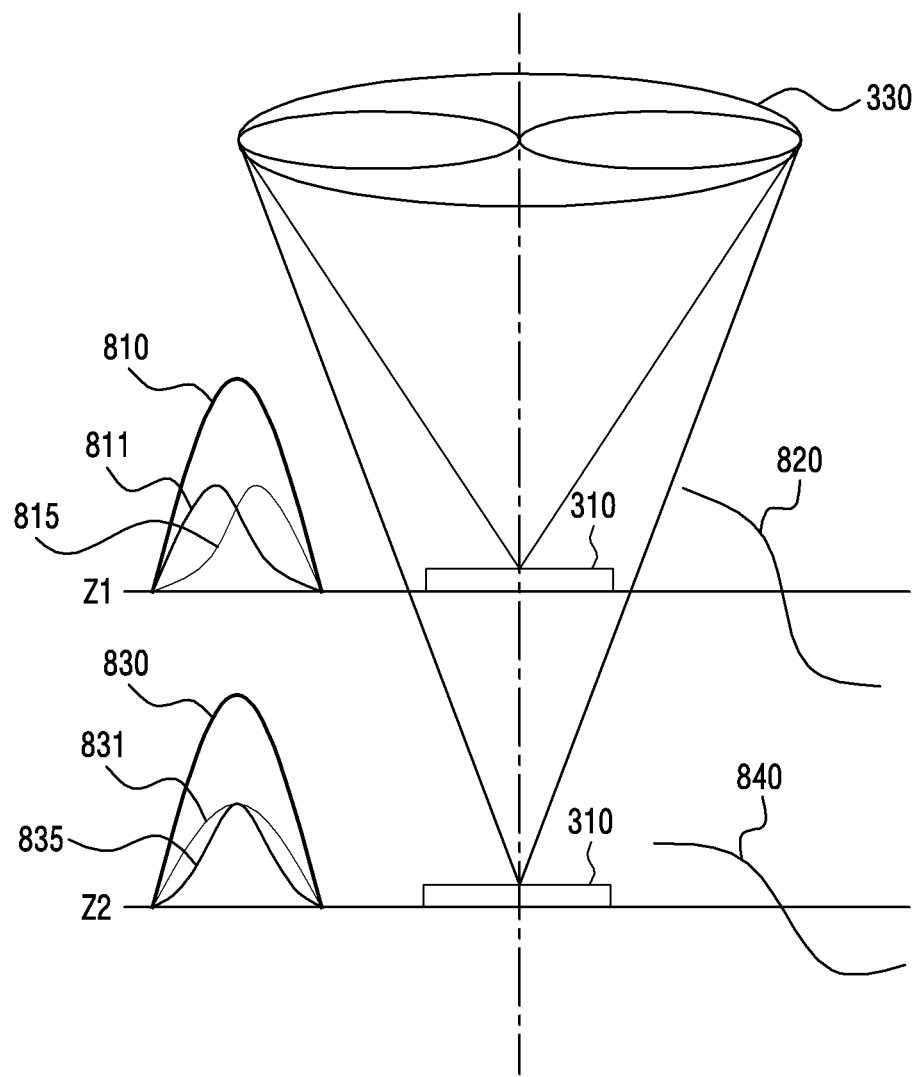
FIG. 8A is a diagram illustrating changes of a luminance ratio obtained according to a change of a focus position of an image sensor of a camera module according to an embodiment of the disclosure.

FIG. 8A is a diagram illustrating changes of a luminance ratio obtained according to a change of a focus position of an image sensor according to an embodiment of the disclosure. FIG. 8A may be described with reference to the configurations of the camera module 300 of FIG. 3.

Referring to FIG. 8A, as the lens 330 moves, if the image sensor 310 is positioned at a position of Z1 (e.g., a position of near focus), luminance values of one column (or one row) of the image acquired by the image sensor 310 may correspond to a curve 810. Referring to FIG. 8A, if the image sensor 310 is positioned at the position of Z1 (e.g., the position of the near focus), luminance values of one column (or one row) of the images acquired by the first sub PDs of the image sensor 310 may correspond to a curve 811. Referring to FIG. 8A, if the image sensor 310 is positioned at the position of Z1 (e.g., the position of the near focus), luminance values of one column (or one row) of the images acquired by the second sub PDs of the image sensor 310 may correspond to a curve 815. In an embodiment of the disclosure, the curve 810 may correspond to a sum of the curve 811 and the curve 815. Referring to FIG. 8A, if the image sensor 310 is positioned at the position of Z1 (e.g., the position of the near focus), an angle of the incident light to each photodiode 410 of the image sensor 310 relatively increases based on the optical axis of the lens 330 and accordingly a luminance ratio 820 may have relatively considerable changes in a form which is open to both sides as shown in the curve 811 and the curve 815.

Referring to FIG. 8A, as the lens 330 moves, if the image sensor 310 is positioned at a position of Z2 (e.g., a position of far focus), luminance values of one column (or one row) of the image acquired by the image sensor 310 may correspond to a curve 830. Referring to FIG. 8A, if the image sensor 310 is positioned at the position of Z2 (e.g., the position of the far focus), luminance values of one column (or one row) of the images acquired by the first sub PDs of the image sensor 310 may correspond to a curve 831. Referring to FIG. 8A, if the image sensor 310 is positioned at the position of Z2 (e.g., the position of the far focus), luminance values of one column (or one row) of the images acquired by the second sub PDs of the image sensor 310 may correspond to a curve 835. In an embodiment of the disclosure, the curve 830 may correspond to a sum of the curve 831 and the curve 835. Referring to FIG. 8A, if the image sensor 310 is positioned at the position of Z2 (e.g., the position of the far focus), the angle of the incident light to each photodiode 410 of the image sensor 310 relatively decreases based on the optical axis of the lens 330 and accordingly a luminance ratio 820 may have relatively small changes in a form converging to the center as shown in the curve 831 and the curve 835.

Referring to FIG. 8A, despite the position of the image sensor 310, positions of peak values of the curves 810 and 830 are similar to each other, whereas positions of peak values of the curves 811, 815, 831, and 835 may vary, according to the position of the image sensor 310. Hence, the luminance ratio may differ, depending on the optical characteristics (e.g., the position of the image sensor 310) of the image acquisition.

Figure 8B:
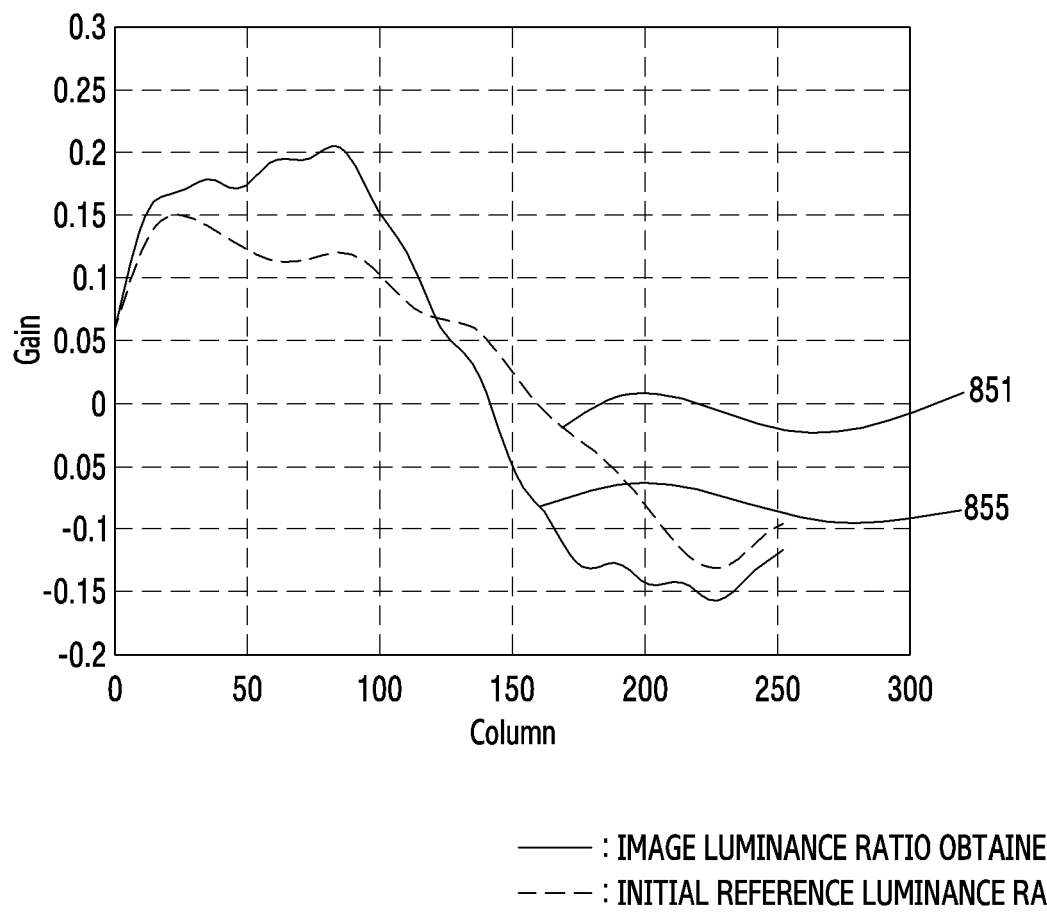
FIG. 8B is a graph showing a luminance ratio of an image acquired at a first focus position of an image sensor and an initial reference luminance ratio according to an embodiment of the disclosure.

FIG. 8B is a graph illustrating a luminance ratio of an image acquired at a first focus position of an image sensor and an initial reference luminance ratio arbitrarily set according to an embodiment of the disclosure.

Figure 8C:
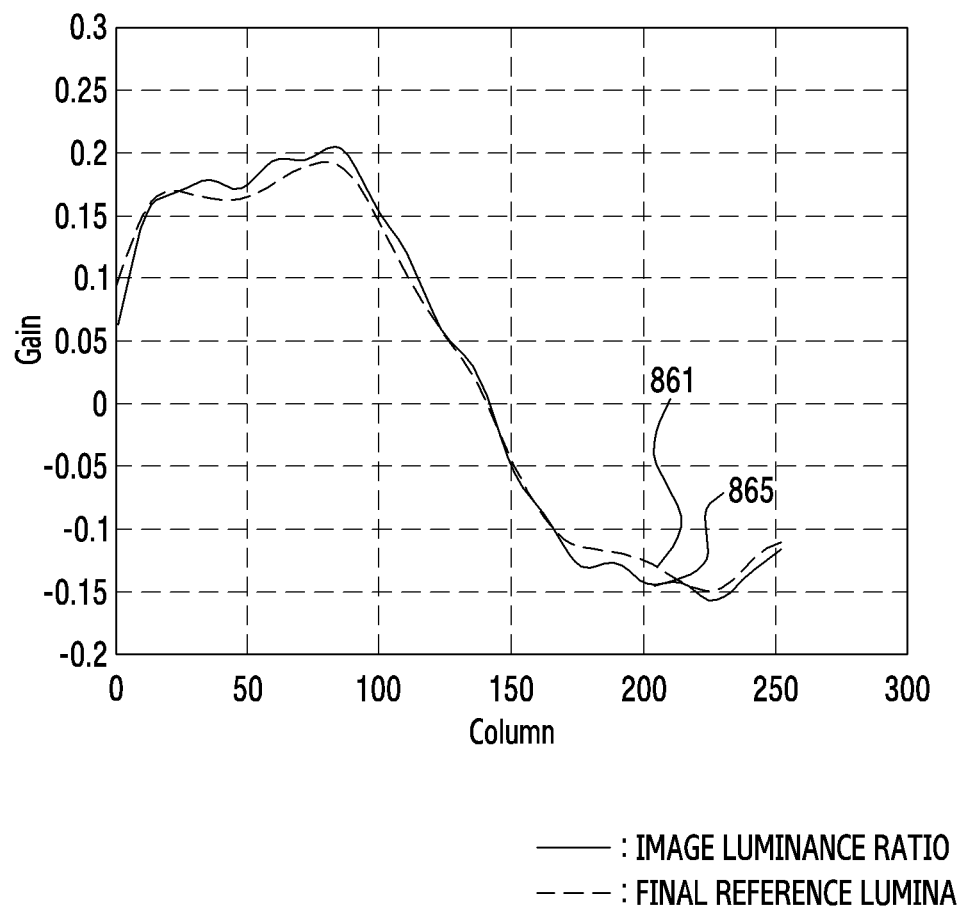
FIG. 8C is a graph showing a corrected luminance ratio and a final reference luminance ratio of an image acquired at a first focus position of an image sensor according to an embodiment of the disclosure.

FIG. 8C is a graph illustrating a luminance ratio of an image acquired at a first focus position of an image sensor and a most similar reference luminance ratio according to an embodiment of the disclosure. In an embodiment of the disclosure, a luminance ratio 855 of FIG. 8B and a luminance ratio 865 of FIG. 8C may be the same luminance ratios.

Figure 8D:
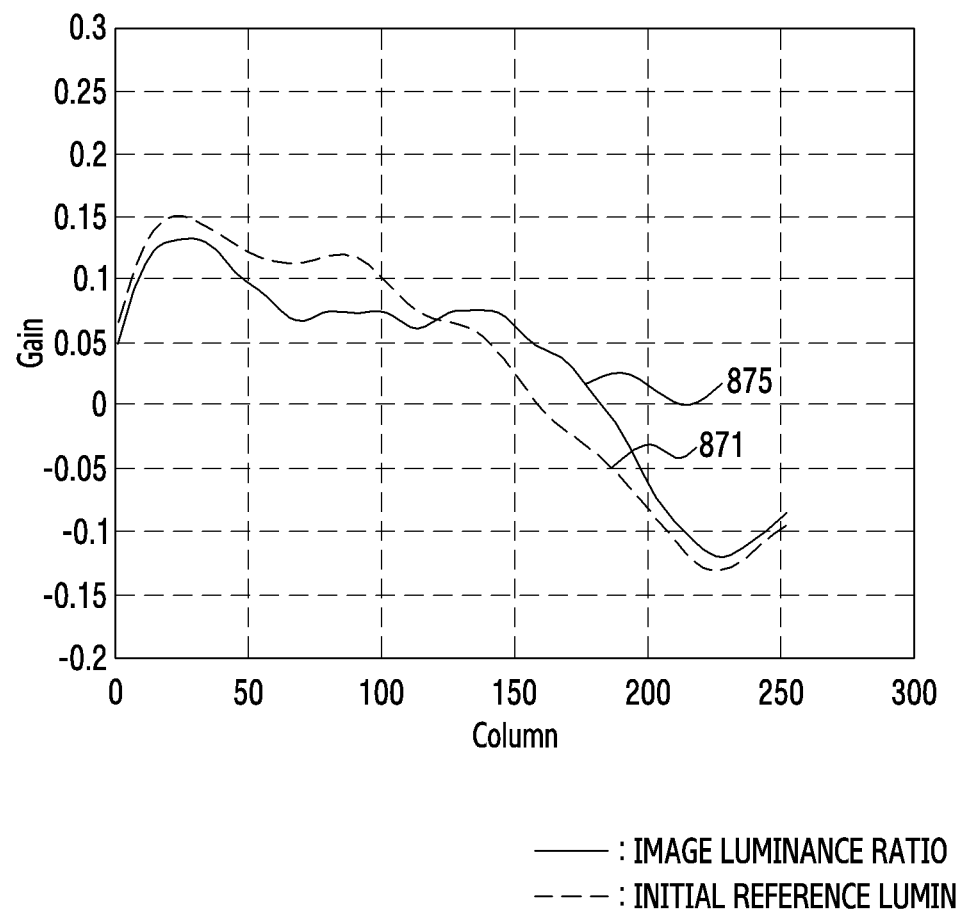
FIG. 8D is a graph showing a luminance ratio and an initial reference luminance ratio of an image acquired at a second focus position of an image sensor according to an embodiment of the disclosure.

FIG. 8D is a graph illustrating a luminance ratio of an image acquired at a second focus position of an image sensor and an initial reference luminance ratio arbitrarily set according to an embodiment of the disclosure.

Figure 8E:
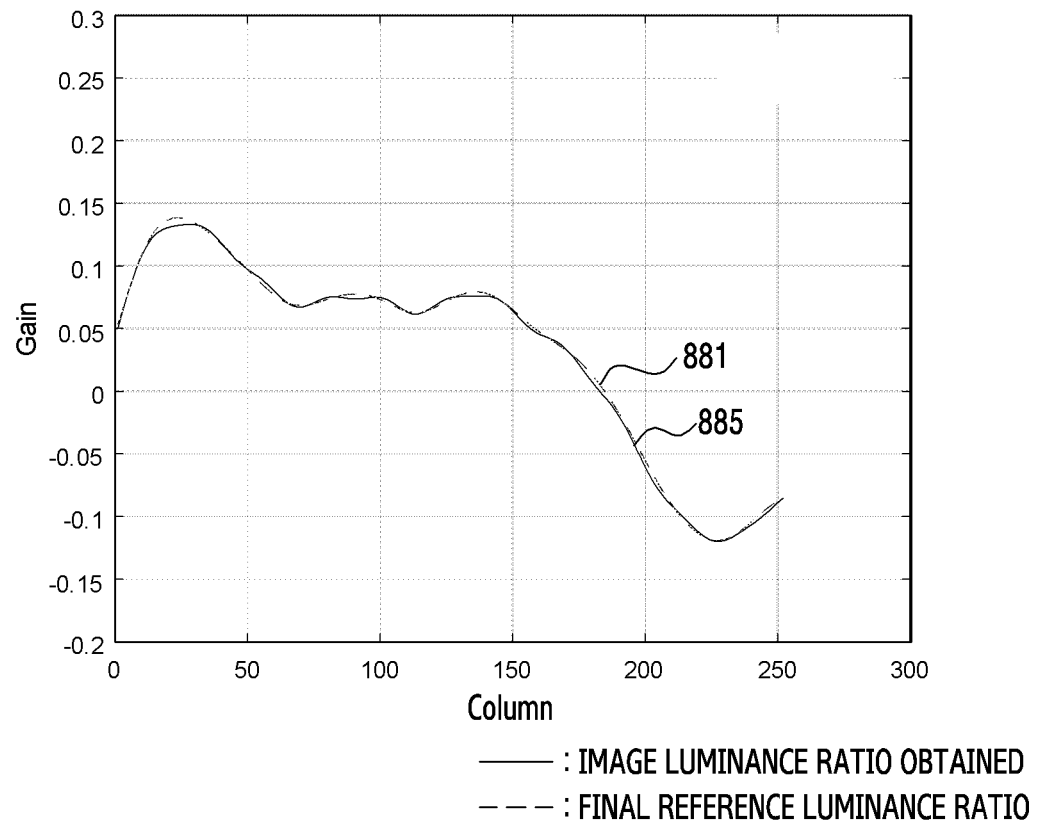
FIG. 8E is a graph showing a corrected luminance ratio and a final reference luminance ratio of an image acquired at a second focus position of an image sensor according to an embodiment of the disclosure.

FIG. 8E is a graph illustrating a luminance ratio of an image acquired at a second focus position of an image sensor and a most similar reference luminance ratio according to an embodiment of the disclosure.

In an embodiment of the disclosure, a luminance ratio 875 of FIG. 8D and a luminance ratio 885 of FIG. 8E may be the same luminance ratios. FIGS. 8B to 8E may be described with reference to the configurations of the camera module 300 of FIG. 3.

In an embodiment of the disclosure, the matching unit 390 may identify the reference luminance ratio, by comparing the reference luminance ratios stored in the memory 395 with the luminance ratio 855 of the image acquired at the first focus position (e.g., the position of Z1, the position 850 of the near focus).

Referring to FIG. 8B, a difference may exist between the luminance ratio 855 of the image acquired at the first focus position (e.g., the position of Z1, the position 850 of the near focus) and an initial reference luminance ratio 851 arbitrarily set. Hence, the matching unit 390 may not determine the arbitrarily set initial reference luminance ratio 851 as the reference luminance ratio for the luminance ratio 855 of the acquired image. By contrast, referring to FIG. 8C, the difference between the luminance ratio 865 of the image acquired at the first focus position (e.g., the position of Z1, the position of the near focus) and the reference luminance ratio 861 may be relatively less than other reference luminance ratios. Thus, the matching unit 390 may determine the reference luminance ratio 861 as the reference luminance ratio for the luminance ratio 865 of the acquired image.

Referring to FIG. 8D, there may be a difference between the luminance ratio 875 of the image acquired at the second focus position (e.g., the position of Z2, the position 860 of the far focus) and an arbitrarily set initial reference luminance ratio 871. Hence, the matching unit 390 may not determine the arbitrarily set initial reference luminance ratio 871 as the reference luminance ratio for the luminance ratio 875 of the acquired image. By contrast, referring to FIG. 8E, the difference between the luminance ratio 885 of the image acquired at the second focus position (e.g., the position of Z2, the position of the far focus) and a reference luminance ratio 881 may be relatively less than other reference luminance ratios. Hence, the matching unit 390 may determine the reference luminance ratio 881 as the reference luminance ratio for the luminance ratio 885 of the acquired image.

Figure 9:
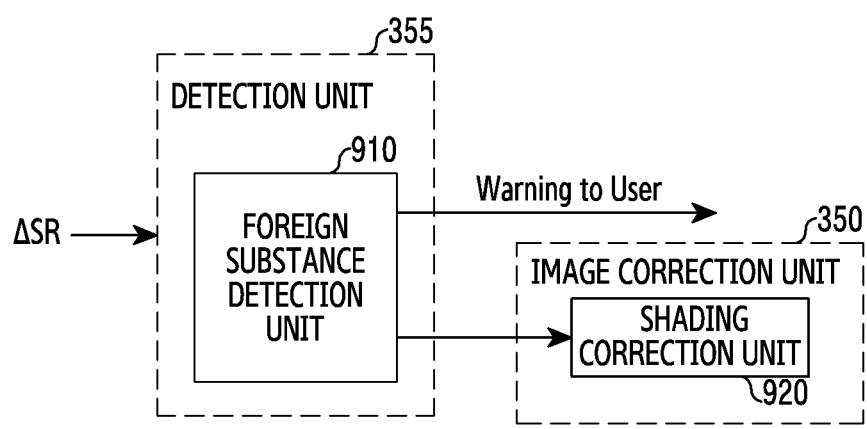
FIG. 9 is a block diagram illustrating a detection unit and an image correction unit of a camera module according to an embodiment of the disclosure.

FIG. 9 is a block diagram illustrating a detection unit and an image correction unit of a camera module according to an embodiment of the disclosure. FIG. 9 may be described with reference to the configurations of the camera module 300 of FIG. 3.

Referring to FIG. 9, the detection unit 355 may include a foreign substance detection unit 910. Referring to FIG. 9, the image correction unit 350 may include a shading correction unit 920.

In an embodiment of the disclosure, the foreign substance detection unit 910 may detect a defect (or, noise) due to a foreign substance in the raw image 701, based on the difference value $\Delta SR(i)$. In an embodiment of the disclosure, the foreign substance detection unit 910 may detect the defect (or, noise) caused by the foreign substance in the raw image 701, based on the average value of the difference value $\Delta SR(i)$. In an embodiment of the disclosure, if the average value of the difference value $\Delta SR(i)$ is greater than a predesignated reference average value, the foreign substance detection unit 910 may determine the defect (or, noise) due to the foreign substance in the raw image 701.

In an embodiment of the disclosure, if determining the defect (or, noise) caused by the foreign substance, the foreign substance detection unit 910 may provide information to the processor 120, to notify a notification to the user. In an embodiment of the disclosure, if determining the defect (or, noise) due to the foreign substance, the foreign substance detection unit 910 may provide information to the shading correction unit 920 to correct the defect (or, noise) due to the foreign substance.

In an embodiment of the disclosure, the shading correction unit 920 may identify a correction value which minimizes the difference value $\Delta SR(i)$, and correct the raw image 701, based on the identified correction value.

Figure 10A:
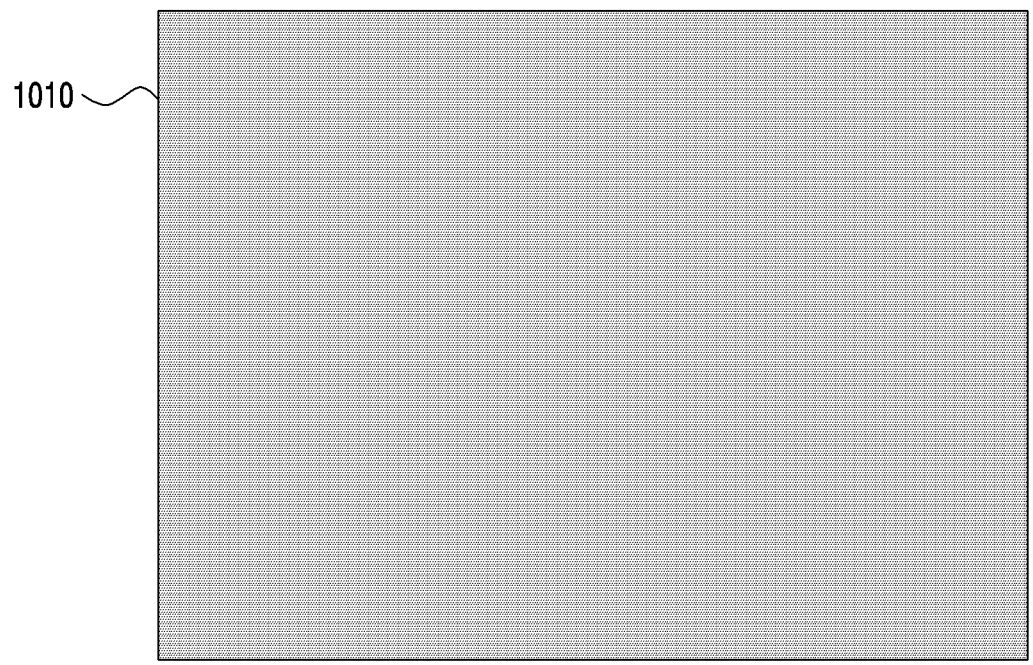
FIG. 10A is a diagram illustrating an image acquired if there is no foreign substance on a cover of a camera module according to an embodiment of the disclosure.

FIG. 10A is a diagram illustrating an image acquired if there is no foreign substance on a cover of a camera module according to an embodiment of the disclosure.

Figure 10B:
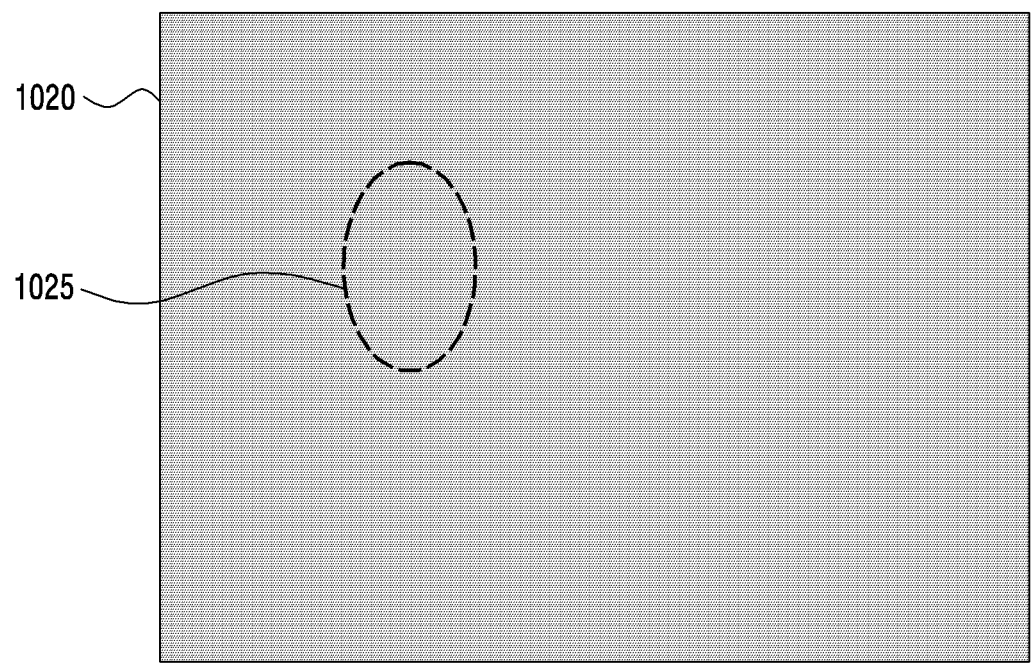
FIG. 10B is a diagram illustrating an image acquired if there is a foreign substance on a cover of a camera module according to an embodiment of the disclosure.

FIG. 10B is a diagram illustrating an image acquired if there is a foreign substance on a cover of a camera module according to an embodiment of the disclosure.

Figure 10C:
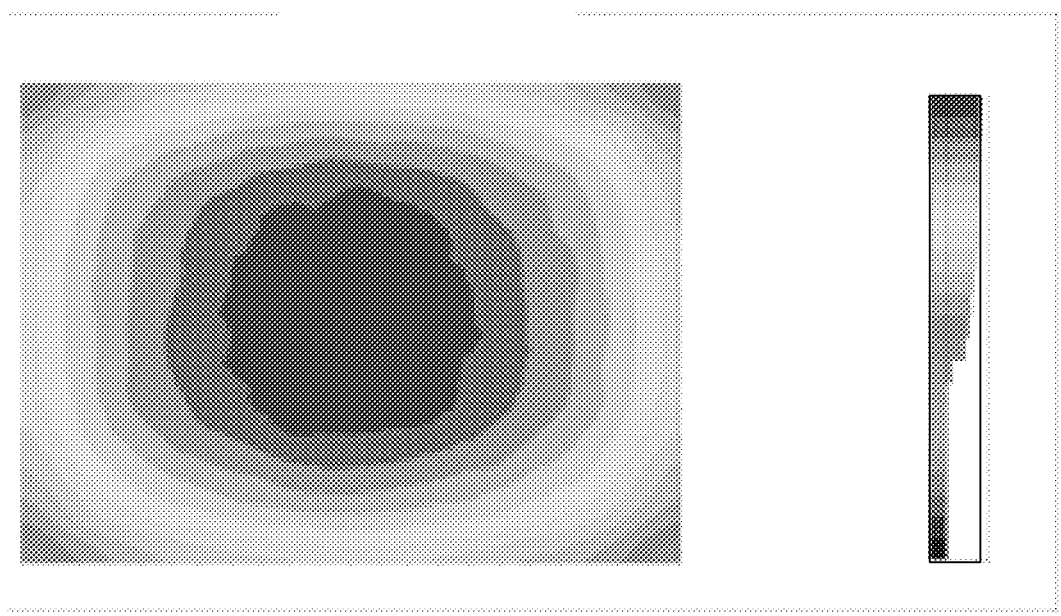
FIG. 10C is a diagram illustrating light amount simulation results of an image acquired if there is no foreign substance on a cover of a camera module according to an embodiment of the disclosure.

FIG. 10C is a diagram illustrating light amount simulation results of an image acquired if there is no foreign substance on a cover of a camera module according to an embodiment of the disclosure.

Figure 10D:
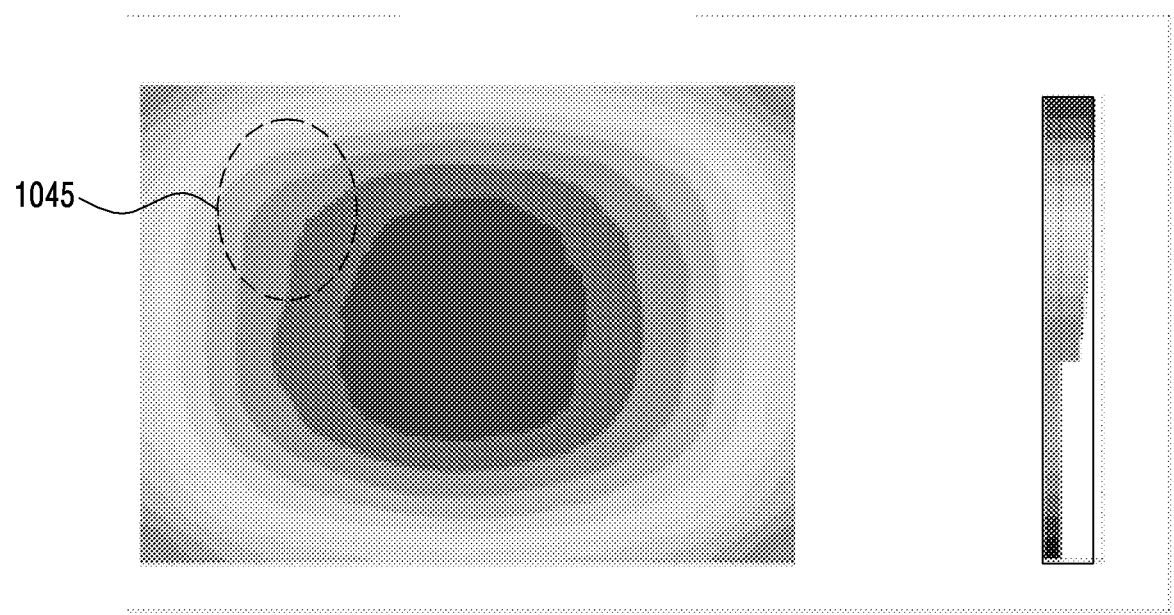
FIG. 10D is a diagram illustrating light amount simulation results of an image acquired if there is a foreign substance on a cover of a camera module according to an embodiment of the disclosure.

FIG. 10D is a diagram illustrating light amount simulation results of an image acquired if there is a foreign substance on a cover of a camera module according to an embodiment of the disclosure.

Figure 10E:
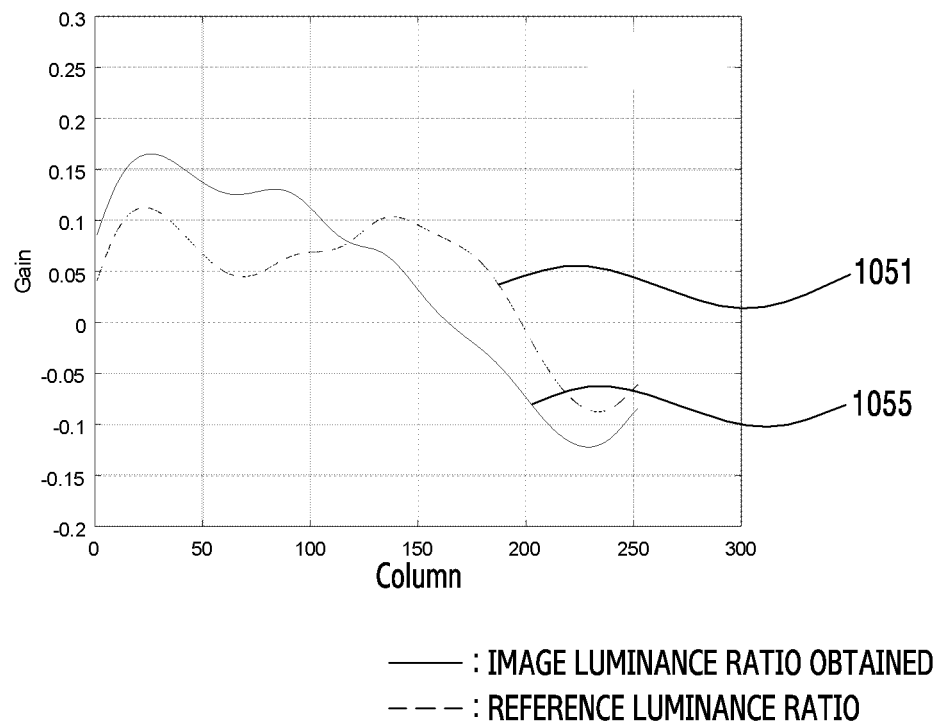
FIG. 10E is a graph showing a luminance ratio and a reference luminance ratio of an image acquired if a foreign substance exists on a cover of a camera module according to an embodiment of the disclosure.

FIG. 10E is a graph illustrating a luminance ratio of an image acquired if there is a foreign substance on a cover of a camera module and a reference luminance ratio according to an embodiment of the disclosure.

FIGS. 10A to 10E may be described with reference to the configurations of the camera module 300 of FIG. 3.

As seen from the image 1010 shown in FIG. 10A and the image 1020 shown in FIG. 10B, if the foreign substance 1025 is attached to the cover (or, the lens 330) of the camera module 300, a difference between the images 1010 and 1020 may not be visually recognized. However, referring to the simulation results illustrated in FIGS. 10C and 10D, a difference of the light amount may occur between the images 1010 and 1020 according to a type of the foreign substance and/or a shape of the foreign substance. Referring to FIG. 10D, the light amount is reduced, in a region 1045 having the foreign substance, compared to the absence of the foreign substance of FIG. 10C.

Referring to FIG. 10E, as the foreign substance is present on the cover (or, the lens 330), a luminance ratio 1055 of the acquired raw image may be slightly different from a reference luminance ratio 1051.

In an embodiment of the disclosure, the shading correction unit 920 may identify a correction value for minimizing the difference value $\Delta SR(i)$ between the luminance ratio 1055 and the reference luminance ratio 1051, and correct the raw image, based on the identified correction value.

Figure 11:
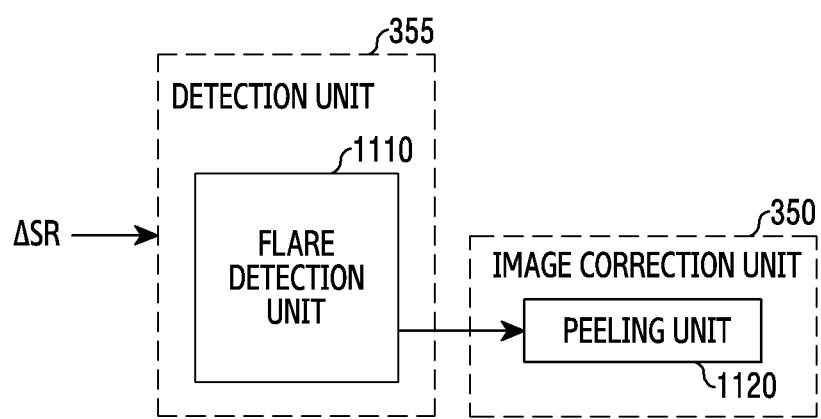
FIG. 11 is a block diagram illustrating a detection unit and an image correction unit of a camera module according to an embodiment of the disclosure.

FIG. 11 is a block diagram illustrating a detection unit and an image correction unit of a camera module according to an embodiment of the disclosure. FIG. 11 may be described with reference to the configurations of the camera module 300 of FIG. 3.

Referring to FIG. 11, the detection unit 355 may include a flare detection unit 1110. Referring to FIG. 11, the image correction unit 350 may include a peeling unit 1120.

In an embodiment of the disclosure, the flare detection unit 1110 may detect a defect (or, noise) due to a flare in the raw image 701, based on the difference value $\Delta SR(i)$. In an embodiment of the disclosure, the flare detection unit 1110 may detect the defect (or, noise) due to the flare in the raw image 701, based on the difference value $\Delta SR(i)$ and the predesignated reference difference value. In an embodiment of the disclosure, the flare detection unit 1110 may determine a pixel having the difference value $\Delta SR(i)$ greater than the predesignated reference difference value among the pixels of the raw image 701 as a pixel having the defect (or, noise) due to the flare.

In an embodiment of the disclosure, if determining the defect (or, noise) due to the flare, the flare detection unit 1110 may provide information to the peeling unit 1120 to correct the defect (or, noise) due to the flare.

In an embodiment of the disclosure, the peeling unit 1120 may determine a value of the pixel having the defect (or, noise) due to the flare, based on values of pixels around the pixel having the defect (or, noise) due to the flare. In an embodiment of the disclosure, the peeling unit 1120 may correct the value of the pixel having the defect (or, noise) due to the flare, based on values of high-reliability pixels among the pixels around the pixel having the defect (or, noise) due to the flare.

Figure 12A:
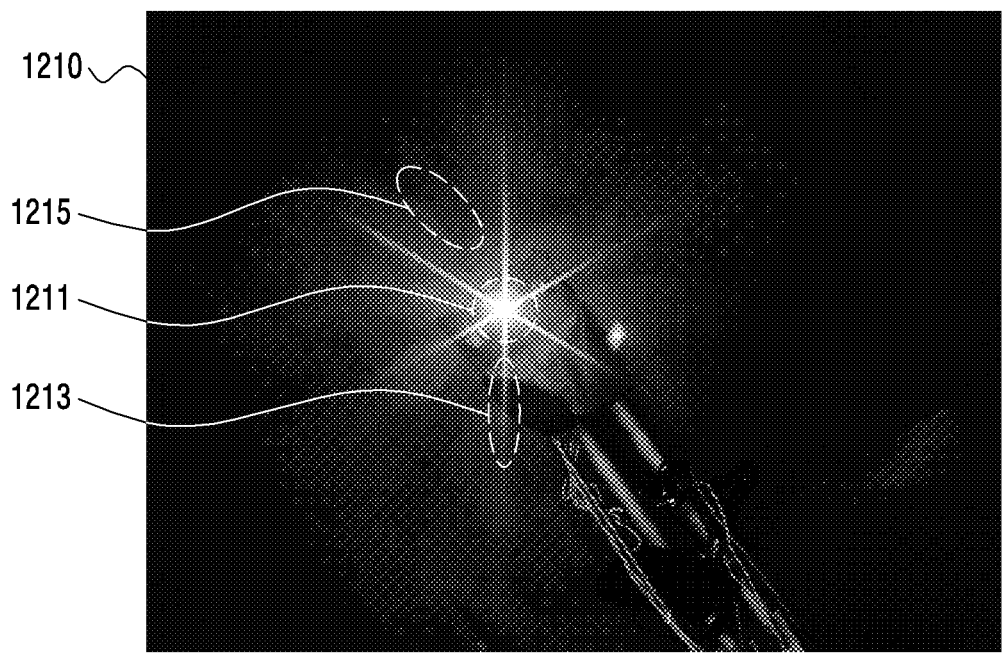
FIG. 12A is a diagram illustrating an image having a defect due to a flare according to an embodiment of the disclosure.

FIG. 12A is a diagram illustrating an image having a defect due to a flare according to an embodiment of the disclosure.

Figure 12B:
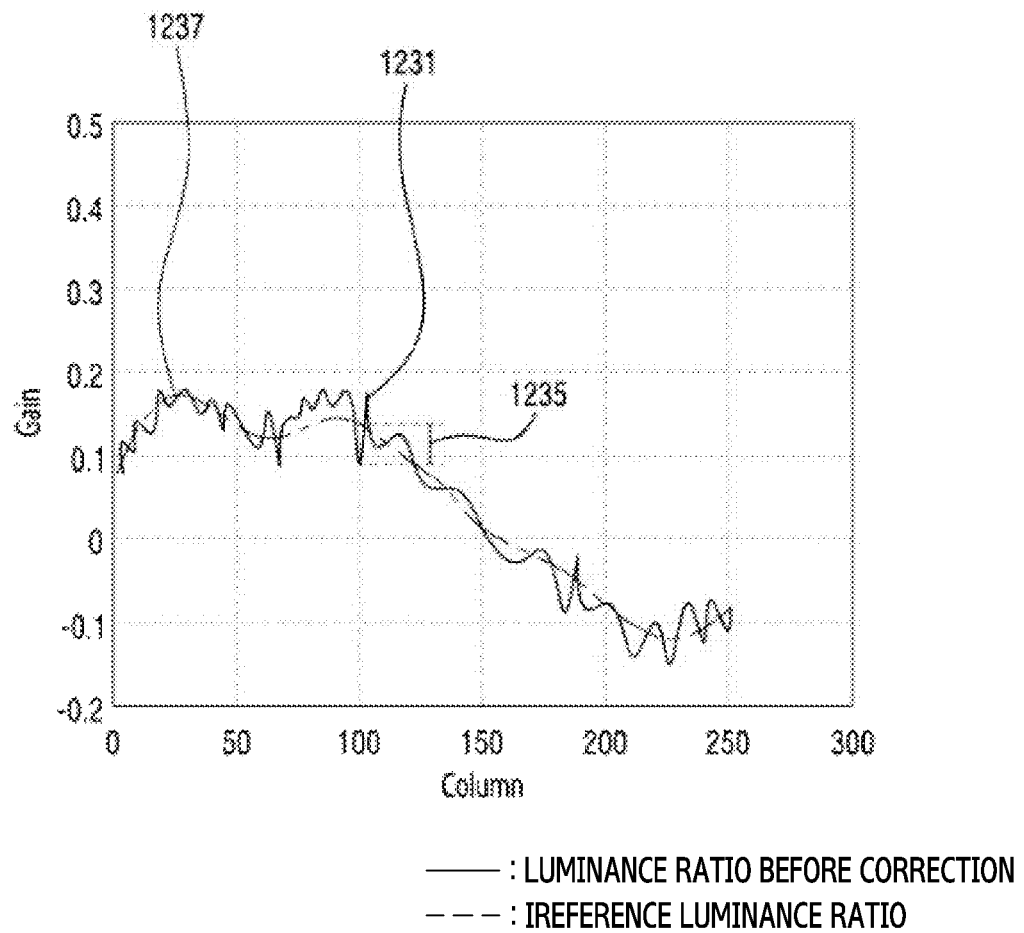
FIG. 12B is a graph illustrating a luminance ratio and a reference luminance ratio of an image having a defect due to a flare according to an embodiment of the disclosure.

FIG. 12B is a graph illustrating a luminance ratio of an image having a defect due to a flare and a reference luminance ratio according to an embodiment of the disclosure.

Figure 12C:
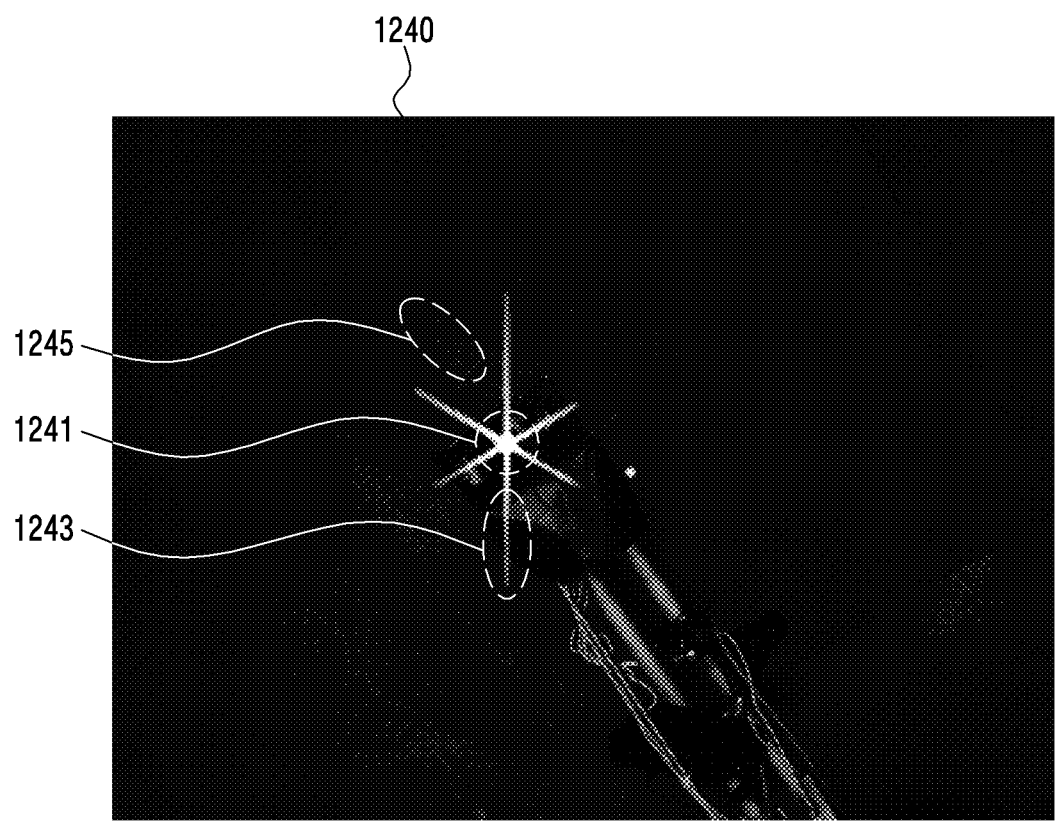
FIG. 12C is a diagram illustrating an image with a defect due to flare corrected according to an embodiment of the disclosure.

FIG. 12C is a diagram illustrating an image with a defect due to a flare corrected according to an embodiment of the disclosure. FIGS. 12A to 12C may be described with reference to the configurations of the camera module 300 of FIG. 3.

Referring to FIG. 12A, if a light amount of a light source 1211 is high, the image 1210 may be subject to light splitting 1213, light scattering 1215, or a combination thereof from the light source 1211. In an embodiment of the disclosure, if the light amount of the light source 1211 is high, a ghost phenomenon may occur in the image 1210.

Referring to FIG. 12B, a luminance ratio 1231 of the pixel having the defect due to the flare among the pixels of the image 1210 may have more sharp points than a reference luminance ratio 1237. Referring to FIG. 12B, the image correction unit 350 (e.g., the peeling unit 1120) may correct with a pixel value having the defect (or, noise) due to the flare, based on a correction value corresponding to a difference 1235 between the luminance ratio 1231 and the reference luminance ratio 1237.

In an embodiment of the disclosure, the image correction unit 350 (e.g., the peeling unit 1120) may correct the pixel having the defect (or, noise) due to the flare based on high-reliability pixels with reference to the reference luminance ratio 1237.

Referring to FIG. 12C, the image 1240 corrected the defect due to the flare is reduced in the size of the light source 1241, is reduced in the size of the light splitting 1243, and is reduced in the light scattering 1245, compared to the image 1210.

Figure 13:
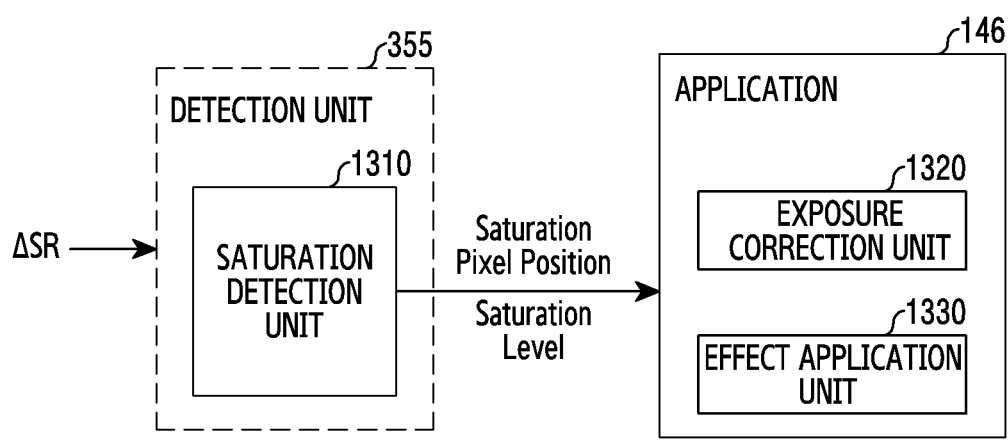
FIG. 13 is a block diagram illustrating a detection unit and an application of a camera module according to an embodiment of the disclosure.

FIG. 13 is a block diagram illustrating a detection unit and an application of a camera module according to an embodiment of the disclosure.

FIG. 13 may be described with reference to the configurations of the camera module 300 of FIG. 3.

Referring to FIG. 13, the detection unit 355 may include a saturation detection unit 1310. Referring to FIG. 13, the application 146 may include an exposure correction module 1320, an effect application module 1330, or a combination thereof.

In an embodiment of the disclosure, the saturation detection unit 1310 may detect a defect (or, noise) due to saturation in the raw image 701, based on the difference value ΔSR(i). In an embodiment of the disclosure, the saturation detection unit 1310 may identify a saturation level of the pixel having the corresponding difference value ΔSR(i) depending on which one of the value of 0, the value between 0 and the value obtained by subtracting the reference luminance ratio from 1, or the value obtained by subtracting the reference luminance ratio from 1 the difference value ΔSR(i) corresponds to.

In an embodiment of the disclosure, if determining the defect (or, noise) due to the saturation, the saturation detection unit 1310 may provide information to the application 146, to correct an image effect.

In an embodiment of the disclosure, the exposure correction module 1320 of the application 146 may adjust exposure, focus, white balance, or a combination thereof, based on the saturation level. In an embodiment of the disclosure, the exposure correction module 1320 may adjust the exposure, the focus, the white balance, or a combination thereof, based on the saturation level, to avoid the saturation.

In an embodiment of the disclosure, the effect application module 1330 of the application 146 may control whether to apply the effect, based on the saturation level. In an embodiment of the disclosure, the effect application module 1330 of the application 146 may control not to apply a light source effect (e.g., a light splitting effect), to a portion having a low saturation level in the image. In an embodiment of the disclosure, the effect application module 1330 of the application 146 may control to apply the light source effect (e.g., a light splitting effect), to a portion of a high saturation level in the image. In an embodiment of the disclosure, the portion having the high saturation level in the image may be a portion corresponding to a pixel in which at least one sub PD of the sub PDs is saturated. In an embodiment of the disclosure, the portion having the low saturation level in the image may be a portion corresponding to a pixel in which the sub PD of the sub PDs is not saturated.

Figure 14A:
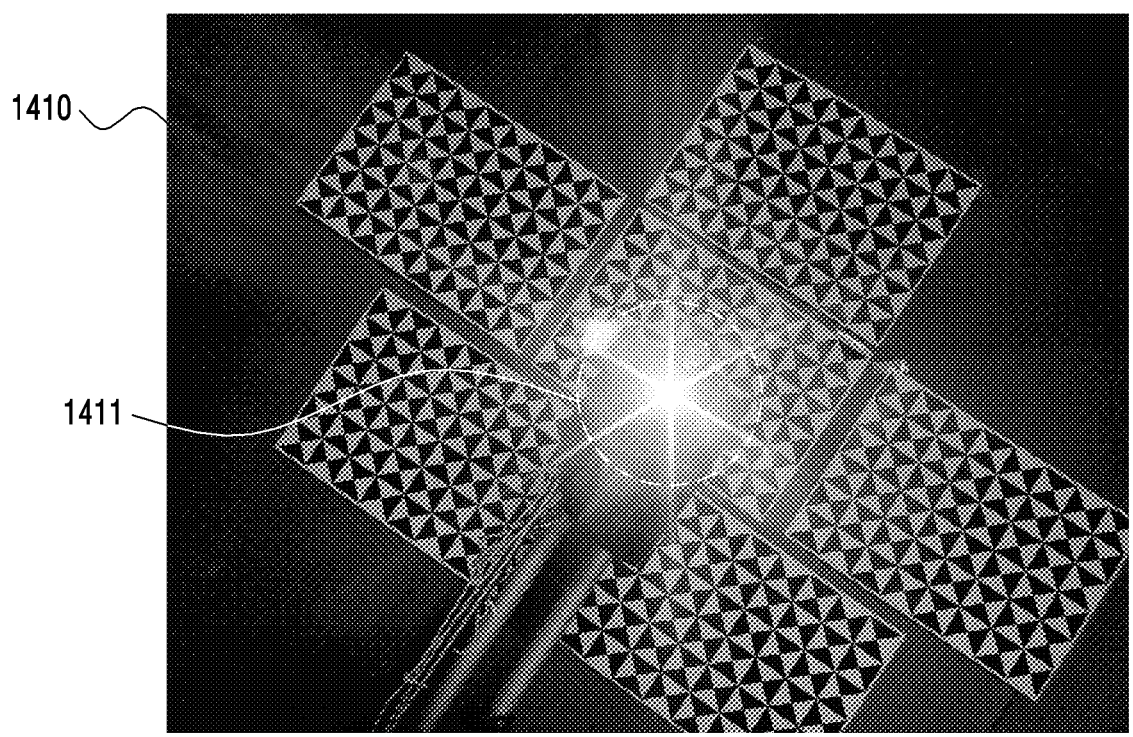
FIG. 14A is a diagram illustrating an image with a low light amount according to an embodiment of the disclosure.

FIG. 14A is a diagram illustrating an image having a low light amount according to an embodiment of the disclosure.

Figure 14B:
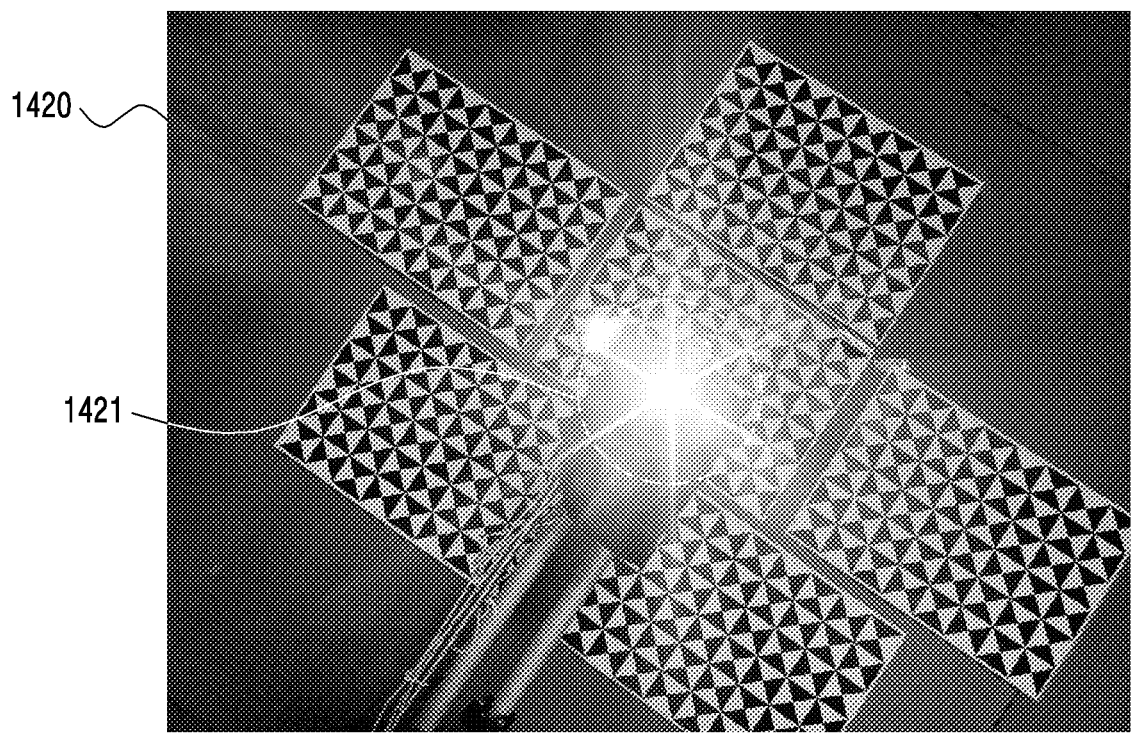
FIG. 14B is a diagram illustrating an image with a high light amount according to an embodiment of the disclosure.

FIG. 14B is a diagram illustrating an image having a high light amount according to an embodiment of the disclosure.

Figure 14C:
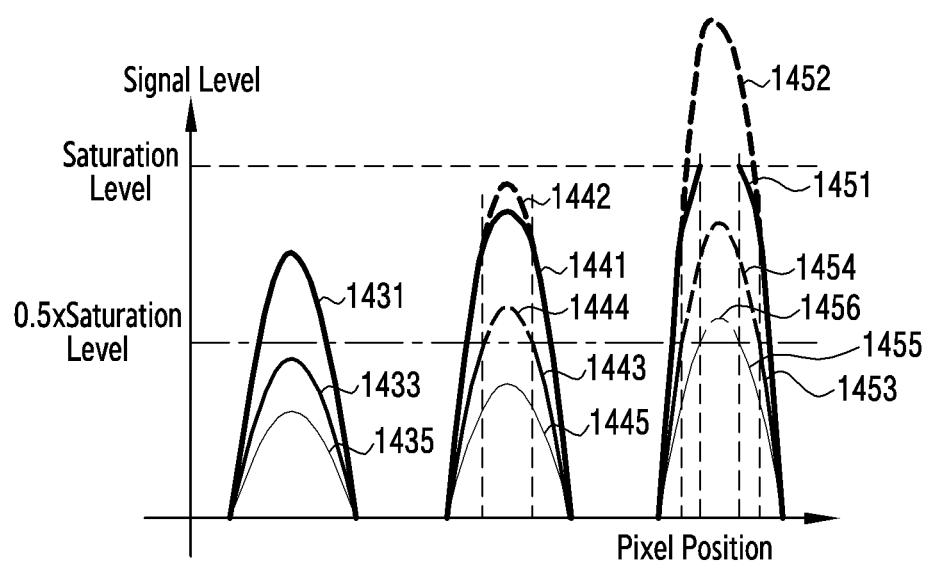
FIG. 14C is a graph illustrating a signal value based on a saturation level according to an embodiment of the disclosure.

FIG. 14C is a graph illustrating a signal value based on a saturation level according to an embodiment of the disclosure.

Figure 14D:
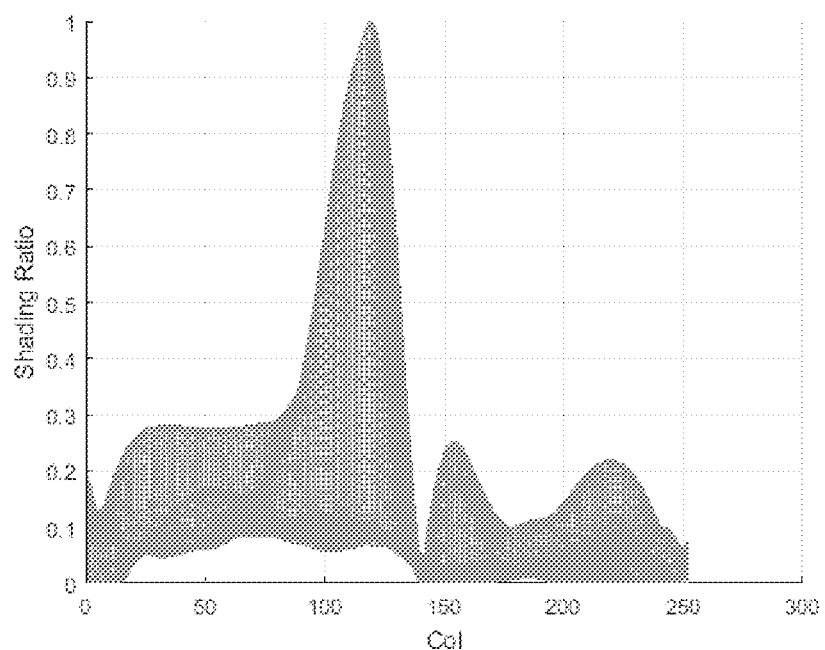
FIG. 14D is a graph showing a luminance ratio of an image with a low light amount according to an embodiment of the disclosure.

FIG. 14D is a graph illustrating a luminance ratio of an image having a low light amount according to an embodiment of the disclosure.

Figure 14E:
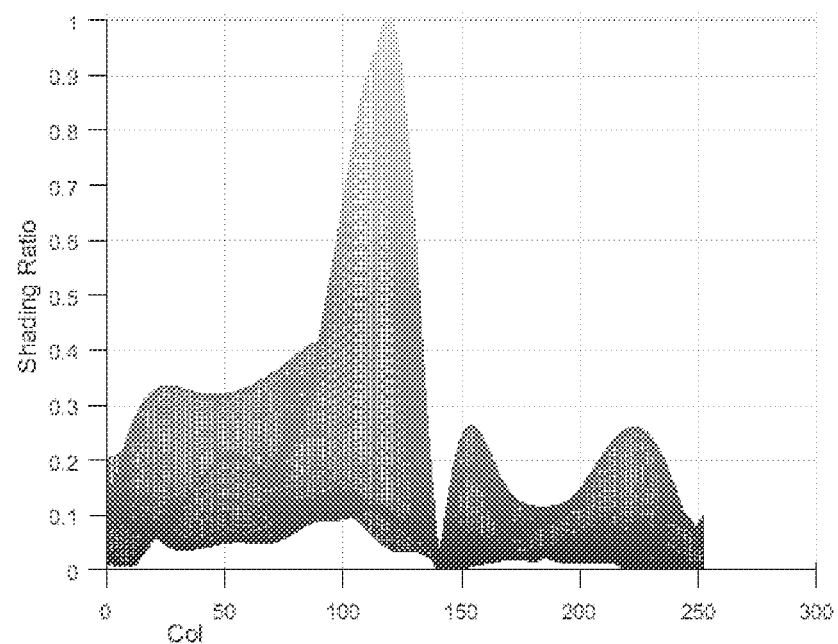
FIG. 14E is a graph showing a luminance ratio of an image with a high light amount according to an embodiment of the disclosure.

FIG. 14E is a graph illustrating a luminance ratio of an image having a high light amount according to an embodiment of the disclosure. FIGS. 14A to 14E shall be described with reference to the configurations of the camera module 300 of FIG. 3.

Referring to FIGS. 14A and 14B, brightness of the light source 1411 of the image 1410 if the light amount is low and the light source 1421 of the image 1420 if the light amount is high may be identical due to the saturation.

Referring to FIG. 14C, if the PDs 415L and 415R are not saturated, a sum signal 1431 of a signal 1433 by the first PD 415L and a signal 1435 by the second PD 415R may be the same as the actual signal. Referring to FIG. 14C, if the first PD 415L is saturated, a sum signal 1441 of the signal 1443 by the first PD 415L and the signal 1445 by the second PD 415R may be different from the actual signal 1442. This is because the signal 1444 corresponding to the light amount actually applied to the first PD 415L is not outputted due to the saturation of the first PD 415L. Referring to FIG. 14C, if the PDs 415L and 415R are saturated, a sum signal 1451 of a signal 1453 by the first PD 415L and a signal 1455 by the second PD 415R may be different from an actual signal 1452. This is because the signal 1454 corresponding to the light amount actually applied to the first PD 415L is not outputted due to the saturation of the first PD 415L, and the signal 1456 corresponding to the light amount actually applied to the second PD 415R is not outputted due to the saturation of the first PD 415L.

Referring to FIGS. 14D and 14E, part of the luminance ratio of the image 1410 if the light amount is low and part of the luminance ratio of the image 1420 if the light amount is high may indicate the saturation.

In an embodiment of the disclosure, the exposure correction module 1320 may adjust the exposure, the focus, the white balance, or a combination thereof, based on the saturation level. In an embodiment of the disclosure, the effect application module 1330 may control whether to apply the effect, based on the saturation level.

Figure 15:
FIG. 15 is a diagram illustrating an image to which a light source effect is applied differently according to a saturation level according to an embodiment of the disclosure.

FIG. 15 is a diagram illustrating an image to which a light source effect is applied differently according to a saturation level according to an embodiment of the disclosure.

Referring to FIG. 15, it may be identified that the light splitting effect is not applied to a light source 1520 having a low saturation level, and the light splitting effect is applied to light sources 1530 and 1540 having high saturation levels.

Figure 16:
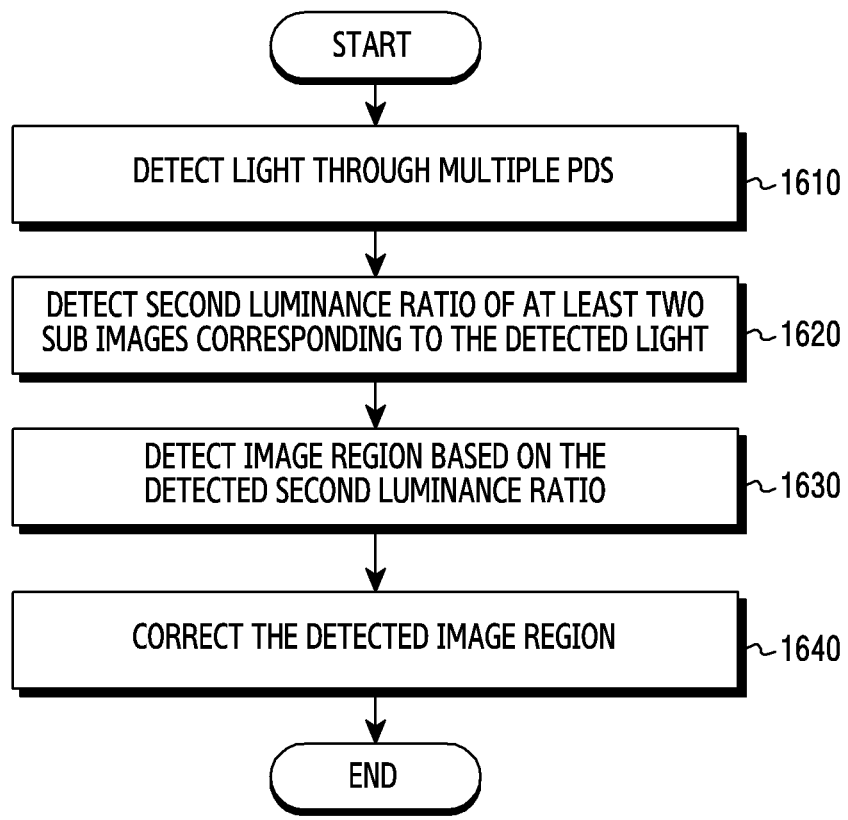
FIG. 16 is a flowchart illustrating operations of an electronic device according to an embodiment of the disclosure.

FIG. 16 is a flowchart illustrating operations of an electronic device according to an embodiment of the disclosure. FIG. 16 shall be described with reference to the configurations of the camera module 300 of FIG. 3.

Referring to FIG. 16, in operation 1610, the camera module 300 of the electronic device 101 may detect light through multiple PDs (e.g., the PDs 410). In an embodiment of the disclosure, the camera module 300 may detect the light through each of the plurality of the PDs 410 of the image sensor 310.

Referring to FIG. 16, in operation 1620, the camera module 300 may detect a luminance ratio of at least two sub images corresponding to the detected light. In an embodiment of the disclosure, the luminance ratio may be a ratio between luminance values of pixels at corresponding positions in the sub images.

In an embodiment of the disclosure, the camera module 300 may detect a luminance ratio between a first sub image corresponding to light detected by a first sub PD (e.g., the first sub PD 415L) of the multi-PD and a second sub image corresponding to light detected by a second sub PD (e.g., the second sub PD 415R) of the multi-PD. In an embodiment of the disclosure, the at least two sub images may be luminance images.

Referring to FIG. 16, in operation 1630, the camera module 300 may detect an image region based on the detected luminance ratio. In an embodiment of the disclosure, the camera module 300 may detect the image region having a defect (or, noise) based on the detected luminance ratio. In an embodiment of the disclosure, the defect (or, noise) may include a foreign substance, a flare, saturation, or a combination thereof.

Referring to FIG. 16, in operation 1640, the camera module 300 may correct the detected image region. In an embodiment of the disclosure, the camera module 300 may correct the value of each of the pixels of the raw image 701, based on information of at least one defect (or, noise). In an embodiment of the disclosure, the camera module 300 may correct values of pixels of the first raw sub image and the second raw sub image, based on the information of at least one defect (or, noise).

In an embodiment of the disclosure, if the raw image 701 has a defect (or, noise) due to a foreign substance, the camera module 300 may correct the values of the pixels of the raw image 701, based on a correction value corresponding to the luminance ratio of each of the pixels of the raw image 701. In an embodiment of the disclosure, if the raw image 701 has a defect (or, noise) due to a flare, the camera module 300 may correct a value of a pixel having the defect (or, noise) due to the flare, based on values of pixels around the pixel having the defect (or, noise) due to the flare.

An electronic device according to an embodiment as set forth above may include a memory, an image sensor in which light receiving elements are arranged, the light receiving elements each including at least two sub light receiving elements, and an image signal processor operatively coupled with the memory, and the image sensor, and the image signal processor may be configured to obtain images corresponding to light from outside by using the image sensor, the images including at least a raw image, a first sub image, and a second sub image, the first sub image being an image corresponding to light detected by at least one first sub light receiving element positioned at a first position corresponding in the light receiving elements, the second sub image being an image corresponding to light detected by at least one second sub light receiving element positioned at a second position corresponding in the light receiving elements, the first position distinguished from the second position, identify a luminance ratio between the first sub image and the second sub image, identify a defect in the raw image, based on the identified luminance ratio, and perform a function corresponding to a type of the identified defect.

In an embodiment of the disclosure, the type of the defect may include a foreign substance, a flare, saturation, or a combination thereof.

In an embodiment of the disclosure, the image signal processor may be configured to identify the foreign substance in the raw image, based on an average value of a difference value obtained by subtracting a reference luminance ratio from the luminance ratio.

In an embodiment of the disclosure, the image signal processor may be configured to, if identifying the foreign substance, identify a correction value for the raw image, based on the identified luminance ratio, and correct the raw image based on the identified correction value.

In an embodiment of the disclosure, the image signal processor may be configured to identify the flare in the raw image, based on a difference value obtained by subtracting a reference luminance ratio from the luminance ratio.

In an embodiment of the disclosure, the image signal processor may be configured to identify a first pixel of which the difference value exceeds a predesignated reference value as a pixel indicating the flare among pixels of the raw image, and correct the raw image, by correcting a value of the first pixel, based on values of adjacent pixels of the first pixel among the pixels of the raw image.

In an embodiment of the disclosure, the image signal processor may be configured to correct the raw image, by correcting the value of the first pixel, based on values of adjacent pixels having reliability greater than or equal to predesignated reliability among adjacent pixels of the first pixel.

In an embodiment of the disclosure, the image signal processor may be configured to identify the saturation in the raw image, based on a position at which the luminance ratio is positioned in an interval between a reference luminance ratio and a predesignated reference value.

In an embodiment of the disclosure, the image signal processor may be configured to, if the luminance ratio is positioned in the interval between the reference luminance ratio and the predesignated reference value, identify that one sub light receiving element of the at least two sub light receiving elements of the at least one first sub light receiving element used to obtain the ratio among the light receiving elements is saturated, and estimate a value of a pixel corresponding to the at least one first sub light receiving element among pixels of the raw image, based on an output value of an unsaturated sub light receiving element among the at least two sub light receiving elements of the at least one first sub light receiving element.

In an embodiment of the disclosure, the image signal processor may be configured to, if the saturation is identified, control an exposure degree of the image sensor, auto white balance (AWB), or a combination thereof.

A method of operating an electronic device according to an embodiment as set forth above may include obtaining images corresponding to light from outside by using an image sensor of the electronic device, the images including at least a raw image, a first sub image, and a second sub image, the first sub image being an image corresponding to light detected by at least one first sub light receiving element positioned at a first position corresponding in the light receiving elements of the electronic device, the second sub image being an image corresponding to light detected by at least one second sub light receiving element positioned at a second position corresponding in the light receiving elements, the first position distinguished from the second position, identifying a luminance ratio between the first sub image and the second sub image, identifying a defect in the raw image, based on the identified luminance ratio, and performing a function corresponding to a type of the identified defect.

In an embodiment of the disclosure, the type of the defect may include a foreign substance, a flare, saturation, or a combination thereof.

In an embodiment of the disclosure, identifying the defect in the raw image may include identifying the foreign substance in the raw image, based on an average value of a difference value obtained by subtracting a reference luminance ratio from the luminance ratio.

In an embodiment of the disclosure, performing the function corresponding to the type of the identified defect may include, if identifying the foreign substance, identifying a correction value for the raw image, based on the identified luminance ratio, and correcting the raw image based on the identified correction value.

In an embodiment of the disclosure, identifying the defect in the raw image may include identifying the flare in the raw image, based on a difference value obtained by subtracting a reference luminance ratio from the luminance ratio.

In an embodiment of the disclosure, performing the function corresponding to the type of the identified defect may include identifying a first pixel of which the difference value exceeds a predesignated reference value as a pixel indicating the flare among pixels of the raw image, and correcting the raw image, by correcting a value of the first pixel, based on values of adjacent pixels of the first pixel among the pixels of the raw image.

In an embodiment of the disclosure, correcting the raw image may include correcting the raw image, by correcting the value of the first pixel, based on values of adjacent pixels having reliability greater than or equal to predesignated reliability among adjacent pixels of the first pixel.

In an embodiment of the disclosure, identifying the defect in the raw image may include identifying the saturation in the raw image, based on a position at which the luminance ratio is positioned in an interval between a reference luminance ratio and a predesignated reference value.

In an embodiment of the disclosure, identifying the defect in the raw image may include, if the luminance ratio is positioned in the interval between the reference luminance ratio and the predesignated reference value, identifying that one sub light receiving element of the at least two sub light receiving elements of the at least one first sub light receiving element used to obtain the ratio among the light receiving elements is saturated, and estimating a value of a pixel corresponding to the at least one first sub light receiving element among pixels of the raw image, based on an output value of an unsaturated sub light receiving element among the at least two sub light receiving elements of the at least one first sub light receiving element.

In an embodiment of the disclosure, performing the function corresponding to the type of the identified defect may include, if the saturation is identified, control an exposure degree of the image sensor, AWB, or a combination thereof.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

In addition, the program may be stored in an attachable storage device accessible via a communication network, such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an image sensor in which light receiving elements are arranged, the light receiving elements each comprising at least two sub light receiving elements;
at least one image signal processor; and
memory storing at least one computer program including computer-executable instructions,
wherein the instructions, when being executed by the at least one image signal processor individually or collectively, causes the electronic device to:
obtain images corresponding to light from outside by using the image sensor, the images comprising at least a raw image, a first sub image, and a second sub image, the first sub image being an image corresponding to light detected by at least one first sub light receiving element positioned at a first position corresponding in the light receiving elements, the second sub image being an image corresponding to light detected by at least one second sub light receiving element positioned at a second position corresponding in the light receiving elements, the first position distinguished from the second position,
identify a luminance ratio between the first sub image and the second sub image, identify a defect in the raw image by subtracting a reference luminance ratio of a plurality of reference luminance ratios from the luminance ratio, the reference luminance ratio of a plurality of reference luminance ratios being determined based on optical characteristics including at least one of an F value, a position of a lens, or a tilting degree of the lens, and perform a function corresponding to a type of the defect.

2. The electronic device of claim 1, wherein the type of the defect comprises a foreign substance, a flare, saturation, or a combination thereof.

3. The electronic device of claim 2, wherein the instructions, when being executed by the at least one image signal processor individually or collectively, causes the electronic device to:
identify the foreign substance in the raw image, based on an average value of a difference value obtained by subtracting the reference luminance ratio from the luminance ratio.

4. The electronic device of claim 3, wherein the instructions, when being executed by the at least one image signal processor individually or collectively, causes the electronic device to:
if identifying the foreign substance, identify a correction value for the raw image, based on the luminance ratio, and
correct the raw image based on the correction value.

5. The electronic device of claim 2, wherein the instructions, when being executed by the at least one image signal processor individually or collectively, causes the electronic device to:
identify the flare in the raw image, based on a difference value obtained by subtracting the reference luminance ratio from the luminance ratio.

6. The electronic device of claim 5, wherein the instructions, when being executed by the at least one image signal processor individually or collectively, causes the electronic device to:
identify a first pixel of which the difference value exceeds a predesignated reference value as a pixel indicating the flare among pixels of the raw image, and
correct the raw image, by correcting a value of the first pixel, based on values of adjacent pixels of the first pixel among the pixels of the raw image.

7. The electronic device of claim 6, wherein the instructions, when being executed by the at least one image signal processor individually or collectively, causes the electronic device to:
correct the raw image, by correcting the value of the first pixel, based on values of adjacent pixels having reliability greater than or equal to predesignated reliability among adjacent pixels of the first pixel.

8. The electronic device of claim 2, wherein the instructions, when being executed by the at least one image signal processor individually or collectively, causes the electronic device to:
identify the saturation in the raw image, based on a position at which the luminance ratio is positioned in an interval between a reference luminance ratio and a predesignated reference value.

9. The electronic device of claim 8, wherein the instructions, when being executed by the at least one image signal processor individually or collectively, causes the electronic device to:
if the luminance ratio is positioned in the interval between the reference luminance ratio and the predesignated reference value, identify that one sub light receiving element of the at least two sub light receiving elements of the at least one first sub light receiving element used to obtain the luminance ratio among the light receiving elements is saturated, and
estimate a value of a pixel corresponding to the at least one first sub light receiving element among pixels of the raw image, based on an output value of an unsaturated sub light receiving element among the at least two sub light receiving elements of the at least one first sub light receiving element.

10. The electronic device of claim 8, wherein the instructions, when being executed by the at least one image signal processor individually or collectively, causes the electronic device to:
if the saturation is identified, control an exposure degree of the image sensor, auto white balance (AWB), or a combination thereof.

11. A method performed by an electronic device, the method comprising:
obtaining, by the electronic device, images corresponding to light from outside by using an image sensor of the electronic device, the images comprising at least a raw image, a first sub image, and a second sub image, the first sub image being an image corresponding to light detected by at least one first sub light receiving element positioned at a first position corresponding in light receiving elements of the electronic device, the second sub image being an image corresponding to light detected by at least one second sub light receiving element positioned at a second position corresponding in the light receiving elements, the first position distinguished from the second position;
identifying, by the electronic device, a luminance ratio between the first sub image and the second sub image;
identifying, by the electronic device, a defect in the raw image by subtracting a reference luminance ratio of a plurality of reference luminance ratios from the luminance ratio, the reference luminance ratio of a plurality of reference luminance ratios being determined based on optical characteristics including at least one of an F value, a position of a lens, or a tilting degree of the lens; and
performing, by the electronic device, a function corresponding to a type of the defect.

12. The method of claim 11, wherein the type of the defect comprises a foreign substance, a flare, saturation, or a combination thereof.

13. The method of claim 12, wherein the identifying of the defect in the raw image comprises:
identifying the foreign substance in the raw image, based on an average value of a difference value obtained by subtracting the reference luminance ratio from the luminance ratio.

14. The method of claim 13, wherein the performing of the function corresponding to the type of the defect comprises:
if identifying the foreign substance, identifying a correction value for the raw image, based on the luminance ratio; and
correcting the raw image based on the correction value.

15. The method of claim 12, wherein the identifying of the defect in the raw image comprises:
identifying the flare in the raw image, based on a difference value obtained by subtracting the reference luminance ratio from the luminance ratio.

16. One or more non-transitory computer-readable storage media storing one or more computer programs including computer-executable instructions that, when executed by one or more processors of an electronic device individually or collectively, cause the electronic device to perform operations, the operations comprising:

obtaining, by the electronic device, images corresponding to light from outside by using an image sensor of the electronic device, the images comprising at least a raw image, a first sub image, and a second sub image, the first sub image being an image corresponding to light detected by at least one first sub light receiving element positioned at a first position corresponding in light receiving elements of the electronic device, the second sub image being an image corresponding to light detected by at least one second sub light receiving element positioned at a second position corresponding in the light receiving elements, the first position distinguished from the second position;

identifying, by the electronic device, a luminance ratio between the first sub image and the second sub image;

identifying, by the electronic device, a defect in the raw image by subtracting a reference luminance ratio of a plurality of reference luminance ratios from the luminance ratio, the reference luminance ratio of a plurality of reference luminance ratios being determined based on optical characteristics including at least one of an F value, a position of a lens, or a tilting degree of the lens; and performing, by the electronic device, a function corresponding to a type of the defect.

17. The one or more non-transitory computer-readable storage media of claim 16, wherein the type of the defect comprises a foreign substance, a flare, saturation, or a combination thereof.

18. The one or more non-transitory computer-readable storage media of claim 17, wherein the identifying of the defect in the raw image comprises:

identifying the foreign substance in the raw image, based on an average value of a difference value obtained by subtracting a reference luminance ratio from the luminance ratio.

19. The electronic device of claim 1, wherein the image sensor further includes a micro lens, an infrared cut-off filter, a color filter, and an antireflection film.

* * * * *